United States Patent
Narayanasamy et al.

(10) Patent No.: US 10,496,552 B2
(45) Date of Patent: Dec. 3, 2019

(54) TRUSTED COMPUTING SYSTEM WITH ENHANCED MEMORY

(71) Applicant: THE REGENTS OF THE UNIVERSITY OF MICHIGAN, Ann Arbor, MI (US)

(72) Inventors: Satish Narayanasamy, Ann Arbor, MI (US); Shaizeen Aga, Ann Arbor, MI (US)

(73) Assignee: THE REGENTS OF THE UNIVERSITY OF MICHIGAN, Ann Arbor, MA (US)

(*) Notice: Subject to any disclaimer, the term of this patent is extended or adjusted under 35 U.S.C. 154(b) by 268 days.

(21) Appl. No.: 15/485,860

(22) Filed: Apr. 12, 2017

(65) Prior Publication Data
US 2018/0300261 A1    Oct. 18, 2018

(51) Int. Cl.
| | |
|---|---|
| *G06F 21/00* | (2013.01) |
| *G06F 12/14* | (2006.01) |
| *G06F 21/60* | (2013.01) |
| *G06F 13/16* | (2006.01) |
| *G06F 13/40* | (2006.01) |
| *G06F 13/42* | (2006.01) |

(52) U.S. Cl.
CPC ......... *G06F 12/1408* (2013.01); *G06F 13/16* (2013.01); *G06F 13/4068* (2013.01); *G06F 13/4282* (2013.01); *G06F 21/602* (2013.01); *G06F 2212/1052* (2013.01); *G06F 2212/402* (2013.01)

(58) Field of Classification Search
CPC ...... G06F 21/72; G06F 12/1408; G06F 21/71; G06F 13/16
See application file for complete search history.

(56) References Cited

U.S. PATENT DOCUMENTS

| | | |
|---|---|---|
| 7,236,455 B1 | 6/2007 | Proudler et al. |
| 8,781,111 B2 | 7/2014 | Qi et al. |
| 9,015,853 B2 | 4/2015 | Stefanov et al. |
| 9,087,200 B2 | 7/2015 | McKeen et al. |
| 9,202,061 B1 | 12/2015 | Polzin et al. |
| 9,495,111 B2 | 11/2016 | Hars et al. |

(Continued)

FOREIGN PATENT DOCUMENTS

| | | |
|---|---|---|
| WO | WO-20140040964 A1 | 3/2014 |
| WO | WO-20160019294 A1 | 2/2016 |

OTHER PUBLICATIONS

B. Chevallier-Mames et al "Low-Cost Solutions for Preventing Simple Side-Channel Analysis: Side-Channel Atomicity", IEEE Transactions on Computers 53(6) (2004).

(Continued)

*Primary Examiner* — Alexander Lagor
(74) *Attorney, Agent, or Firm* — Harness, Dickey & Pierce, P.L.C.

(57) ABSTRACT

A system that executes private enclave functions in a secure high-performance host processor connected to an enhanced memory unit through a conventional memory bus using a packetized interface is disclosed. The logic layer of the enhanced memory unit is included in a trusted computing base (TCB) and is used to implement cryptographic functions. Storage layers of the enhanced memory unit remain outside the TCB and are used to store encrypted data and associated meta-data.

22 Claims, 12 Drawing Sheets

(56) References Cited

U.S. PATENT DOCUMENTS

2014/0298409 A1 10/2014 Mock et al.
2018/0114013 A1* 4/2018 Sood .................. G06F 21/53

OTHER PUBLICATIONS

G. Apecechea "Fine Grain Cross-VM Attacks on Xen and VMware Are Possible!", IACR Cryptology ePrint Archive 2014 (2014).
T. Marena et al "Hardware Security in the IoT", http://embedded-computing.com/articles/hardware-securith-in-the-iot/, (2015).
T. Ristenpart et al "Hey, you, get off of my cloud: exploring information leakage in third-party compute clouds", Proceedings of the 16th ACM conference on Computer and communications security (2009).
Y. Zhang et al "Cross-VM Side Channels and Their Use to Extract Private Keys", Proceedings of the 2012 ACM Conference on Computer and communications security. (2012).

* cited by examiner

TRUSTED COMPUTING SYSTEM WITH ENHANCED MEMORY

GOVERNMENT CLAUSE

This invention was made with government support under Grant No. CCF1149773 awarded by the National Science Foundation and Grant No. HR0011-13-3-002 awarded by the DOD/DARPA. The Government has certain rights in this invention.

FIELD

The present disclosure relates to the field of trusted computing, and more specifically to the use of a secure processor in communication with memory that has compute capabilities.

BACKGROUND

Cloud computing allows clients to outsource their computations to untrusted cloud service providers. Ensuring privacy of code and data while executing software on a computer physically owned and maintained by an untrusted party is challenging. A potential attacker may have physical access to the datacenter making it vulnerable to physical attacks, such as probing of the memory bus.

A common solution is to reduce the attack surface by minimizing the trusted computing base (TCB) to a secure processor and a small portion of the client's application. INTEL SOFTWARE GUARD EXTENSIONS (SGX) is the latest hardware support for building trusted computing systems. INTEL SGX provides hardware primitives for this purpose. An SGX-enabled secure processor seeks to isolate code and data of private enclave functions in an application from the rest of the system, including its own public functions, system software, and hardware peripherals.

An enclave is a secure container that contains both private data and the code that operates on the private data. The application is responsible for specifying the parameters of the enclaves and invokes the enclaves through special CPU instructions. When an enclave is invoked, the untrusted system software loads the enclave contents to the portion of the protected memory allocated for the enclave's execution. The secure processor computes the enclave's measurement hash over initial data and code, which the remote client uses for software attestation. Thereafter, the enclave is executed in a protected mode, hardware checks ensure that every memory access to protected memory is from its enclave.

A significant challenge with secure processors such as SGX is providing defenses against memory bus side channel attacks and cold reboot attacks. While the secure processor is trusted, the memory and the memory bus are not. A conventional secure processor guarantees confidentiality by encrypting data before sending it to memory. In addition, by storing hash message authentication code (HMAC) along with the encrypted data in memory, a secure processor checks the integrity and freshness of data when it is read back. To guarantee the freshness of data, an adversary must be prevented from rolling back the state of a memory block by recording and replaying older packets (either by manipulating values in memory or while transmitted over the bus). To defeat such replay attacks, a conventional secure processor uses Merkle trees to maintain the current versions of memory blocks and verify that read responses return the latest versions. However, Merkle trees impose severe memory space and bandwidth requirements.

These solutions, however, do not prevent an adversary from observing memory addresses, access types (e.g. read/write), trace length, and access times by probing the memory bus. Just by observing memory addresses, researchers have shown that an adversary can infer an execution's control flow, and thereby infer sensitive program inputs and cryptographic keys. Defending against memory bus side channel attacks requires solutions to at least three problems: data and address confidentiality, data integrity and freshness, and timing channel leaks.

To protect confidentiality of addresses (also, access types and write sets), prior solutions employ expensive oblivious RAM (ORAM) solutions. To obfuscate the address pattern, depending on the memory size, an ORAM access may require one to two orders more of memory accesses compared to a normal dynamic random-access memory (DRAM) access. Recent hardware innovations have made significant improvements to bring down the performance cost to about a factor of 4 times that of non ORAM memory. However, the reduction in performance cost comes with a significant increase in hardware complexity and space overhead.

In addition, ORAM does not protect either memory access times or the total number of memory accesses from leaking. To protect this information from leaking, a technique called memory-trace obliviousness (MTO) may be performed. To guarantee MTO, the number and type of instructions executed, as well as their execution time, must be independent of all sensitive inputs to a program. This technique requires a deterministic compiler and a hardware solution that prohibits almost all commonly used optimizations (e.g. caches, instruction re-ordering, speculation, etc.). Also, the input program needs to obey non-trivial constrains. For example, loop guards need to be independent of sensitive input.

Innovations in the field of 3D integration have led to the rise of 3D-DRAM devices such as the HYBRID MEMORY CUBE (HMC). A typical 3D-DRAM consists of several layers of DRAM dies stacked on top of each other, with a logic layer at the bottom, all internally connected using through-silicon vias. It is almost impossible to physically probe the through-silicon vias without destroying the 3D package. The layers of DRAM are partitioned vertically into vaults. Each vault consists of several DRAM banks and vaults can be accessed in parallel. A 3D-DRAM device is connected to a host processor through a conventional memory bus, such as a Serializer/Deserializer (SerDes) link. Unlike traditional DRAM's double data rate (DDR) interface with low-level commands, a 3D-DRAM device is exposed through a more flexible packet interface.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The disclosure provides a system for trusted computing. The system includes a secure processor configured to perform encryption and decryption and an enhanced memory unit in communication with the secure processor. The secure processor is further configured to transmit a request packet to the enhanced memory unit. The enhanced memory unit comprises a plurality of layers of semiconductor material. A logic layer of the plurality of layers of semiconductor material includes circuits configured to receive the request packet from the secure processor, decrypt the contents of the request packet, and transmit a response packet to the secure processor. A storage layer of the plurality of layers of semiconductor material includes circuits configured as dynamic random access memory (DRAM).

Implementations of the disclosure may include one or more of the following optional features. In some implementations, the secure processor and the enhanced memory unit are mounted on a circuit board. In some implementations, the semiconductor material of the plurality of layers of semiconductor material is silicon and the logic layer and the storage layer are connected by through-silicon vias. In other features, the secure processor is connected to the enhanced memory unit by a serial communications bus.

In some examples, the request packet transmitted by the secure processor is a read request packet. The read request packet includes an encrypted address and the encrypted address defines a location in the storage layer. In addition, the circuits in the logic layer are configured to decrypt the encrypted address included in the read request packet into a read address, retrieve data stored in the storage layer at the read address, and encrypt the retrieved data. The response packet includes the encrypted retrieved data. In some implementations, the data stored in the storage layer at the read address is encrypted data and encrypting the retrieved data includes encrypting the encrypted data.

In some examples, the request packet transmitted by the secure processor is a write request packet. The write request packet includes an encrypted address and encrypted data. The encrypted address defines a location in the storage layer. In addition, the circuits in the logic layer are configured to decrypt, the encrypted address included in the write request packet into a write address and store the encrypted data included in the write request packet in the storage layer at the write address.

In some implementations, the secure processor is configured to transmit a plurality of request packets to the enhanced memory unit over a first period of time. The first period of time is divided into a first set of intervals. In addition, the circuits in the logic layer are configured to transmit a plurality of response packets to the secure processor over a second period of time. The second period of time is divided into a second set of intervals.

In some examples, transmitting a plurality of request packets to the enhanced memory unit over a first period of time includes for each interval in the first set of intervals, determining whether a read or write operation is pending. Transmitting a plurality of request packets to the enhanced memory unit over a first period of time further includes in response to having determined a read operation is pending, transmitting a read request packet to the enhanced memory unit. The read request packet includes an encrypted read address and first encrypted dummy data. In response to having determined a write operation is pending, transmitting a write request packet to the enhanced memory unit. The write request packet includes an encrypted write address and encrypted data to be written to memory. In response to having determined that neither a read operation nor a write operation are pending, transmitting a dummy request packet to the enhanced memory unit. The dummy request packet includes a first encrypted dummy address and second encrypted dummy data.

In some examples, transmitting a plurality of response packets to the secure processor over a second period of time includes for each interval in the second set of intervals, determining whether the read request packet or the write request packet has been received. Transmitting a plurality of response packets to the secure processor over a second period of time further includes in response to having determined that the read request packet has been received: decrypting the address included in the read request packet into a read address, retrieving the data stored at the read address, encrypting the retrieved data, and transmitting a read response packet to the secure processor. The response packet includes the encrypted retrieved data. In response to having determined that the write request packet has been received: decrypting the encrypted address included in the write request packet into a write address, storing the encrypted data included in the write request packet at the write address, and transmitting a write response packet to the secure processor. In response to having determined that neither a read request packet nor a write request packet has been received, sending a dummy response packet to the secure processor.

In some implementations, the read request packet, the write request packet, and the dummy request packet are equal in size. In some implementations, the read response packet, the write response packet, and the dummy response packet are equal in size.

In some examples, the secure processor includes: a first address timestamp register, a first data timestamp register, and a second data timestamp register. The enhanced memory unit includes: a second address timestamp register, a third data timestamp register, and a fourth data timestamp register. In addition, the secure processor is configured to: store a first value in the first address timestamp register, store a second value in the first data timestamp register, and store a third value in the second data timestamp register. The secure processor is also configured to, transmit instructions to the enhanced memory unit to store the first value in the second address timestamp register, store the second value in the third data timestamp register, and store the third value in the fourth data timestamp register. In response to sending the request packet, the secure processor increments the first address timestamp register by one and increments the first data timestamp register by one. The circuits of the logic layer are configured to receive instructions: to store the first value in the second address timestamp register, store the second value in the third data timestamp register, and store the third value in the fourth data timestamp register. The circuits of the logic layer are further configured to, in response to receiving the instructions, store the first value in the second address timestamp register, store the second value in the third data timestamp register, and store the third value in the fourth data timestamp register.

In some examples, the request packet is a read request packet that includes an encrypted read address. The circuits in the logic layer are configured to, in response to receiving the read request packet, determine whether the read request packet is authentic. The circuits in the logic layer are further configured to in response to determining that the read request packet is authentic: decrypt the encrypted read address, increment the second address timestamp register by one, increment the third data timestamp register by one, retrieve data and associated timestamp data stored at the decrypted encrypted read address, verify the integrity of the retrieved data, encrypt the retrieved data and associated timestamp data, increment the fourth data timestamp register by one, and transmit a read response packet to the secure processor. The read response packet includes the encrypted retrieved data and the encrypted associated timestamp data. In some implementations, decrypting the encrypted read address is based on advanced encryption standard (AES) encryption and the second address timestamp register.

In some examples, the secure processor is configured to receive the read response packet and in response to receiving the read response packet, determine if the read response packet is authentic. In addition, the secure processor is configured to in response to determining that the read response packet is authentic decrypt the encrypted retrieved data and the encrypted associated timestamp data contained in the read response packet and increment the fourth data timestamp register by one.

In some examples, the request packet is a write request packet that includes encrypted data and an encrypted write address. The circuits in the logic layer are configured to in response to receiving the write request packet determine whether the write request packet is authentic. The circuits in the logic layer are further configured to in response to determining that the write request packet is authentic: decrypt the encrypted write address, increment the second address timestamp register by one, increment the third data timestamp register by one, store the encrypted data at the decrypted encrypted write address, and transmit a write response packet to the secure processor. In some implementations, decrypting the encrypted write address is based on AES encryption and the second address timestamp register.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
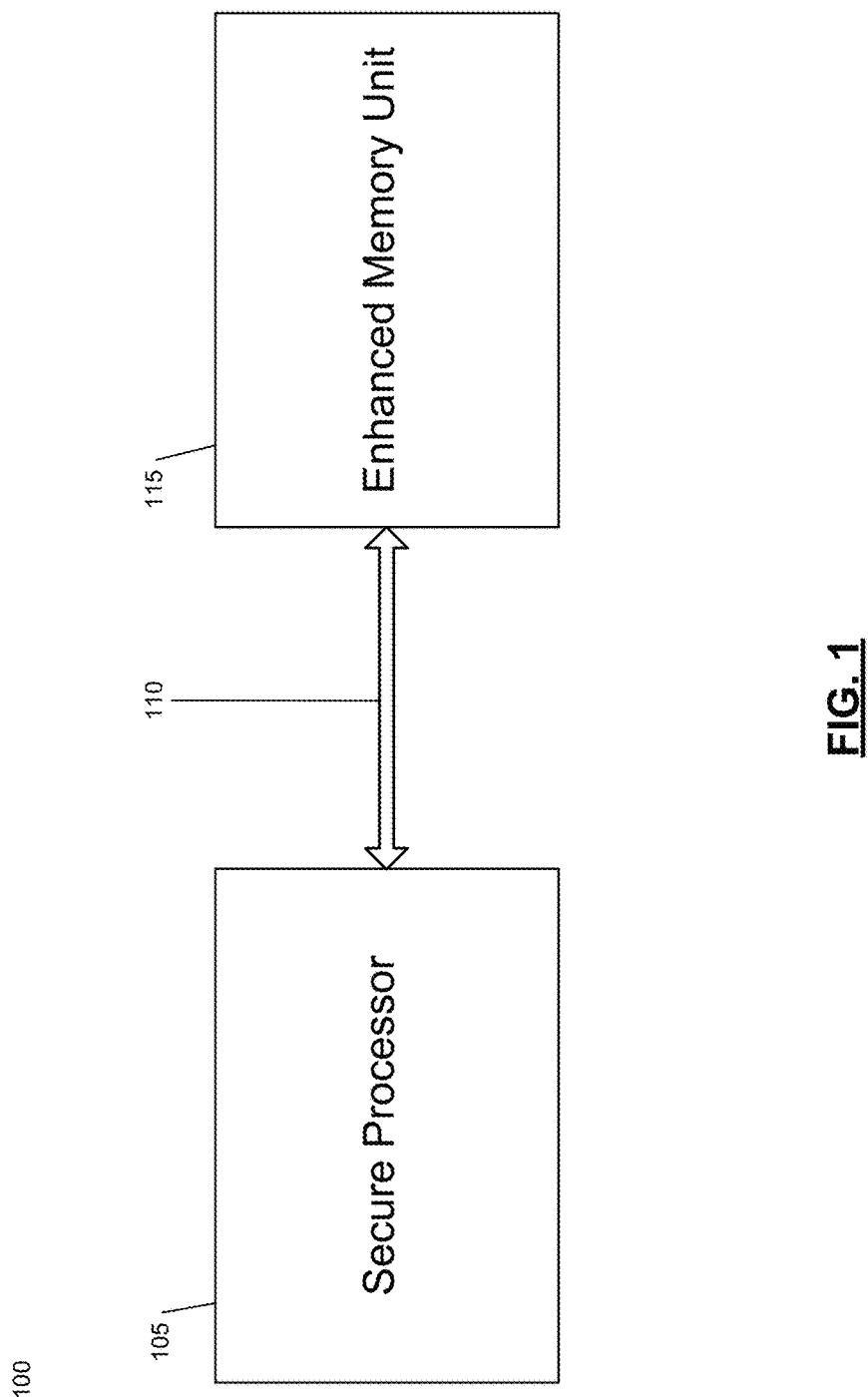
FIG. 1 is a simplified block diagram of a system according to the principles of the present disclosure.

FIG. 1 depicts a general overview of a trusted computing system 100. Trusted computing system 100 includes a secure processor 105 and an enhanced memory unit 115. Secure processor 105 is connected to enhanced memory unit 115 by means of a communications bus 110. Communications bus 110 is a serialized communications bus with a packetized interface. For example, communications bus 110 is a Serializer/Deserializer (SerDes) link. Although in an example embodiment, communications bus 110 is a SerDes link, in other embodiments different known communications links may be used.

Figure 2:
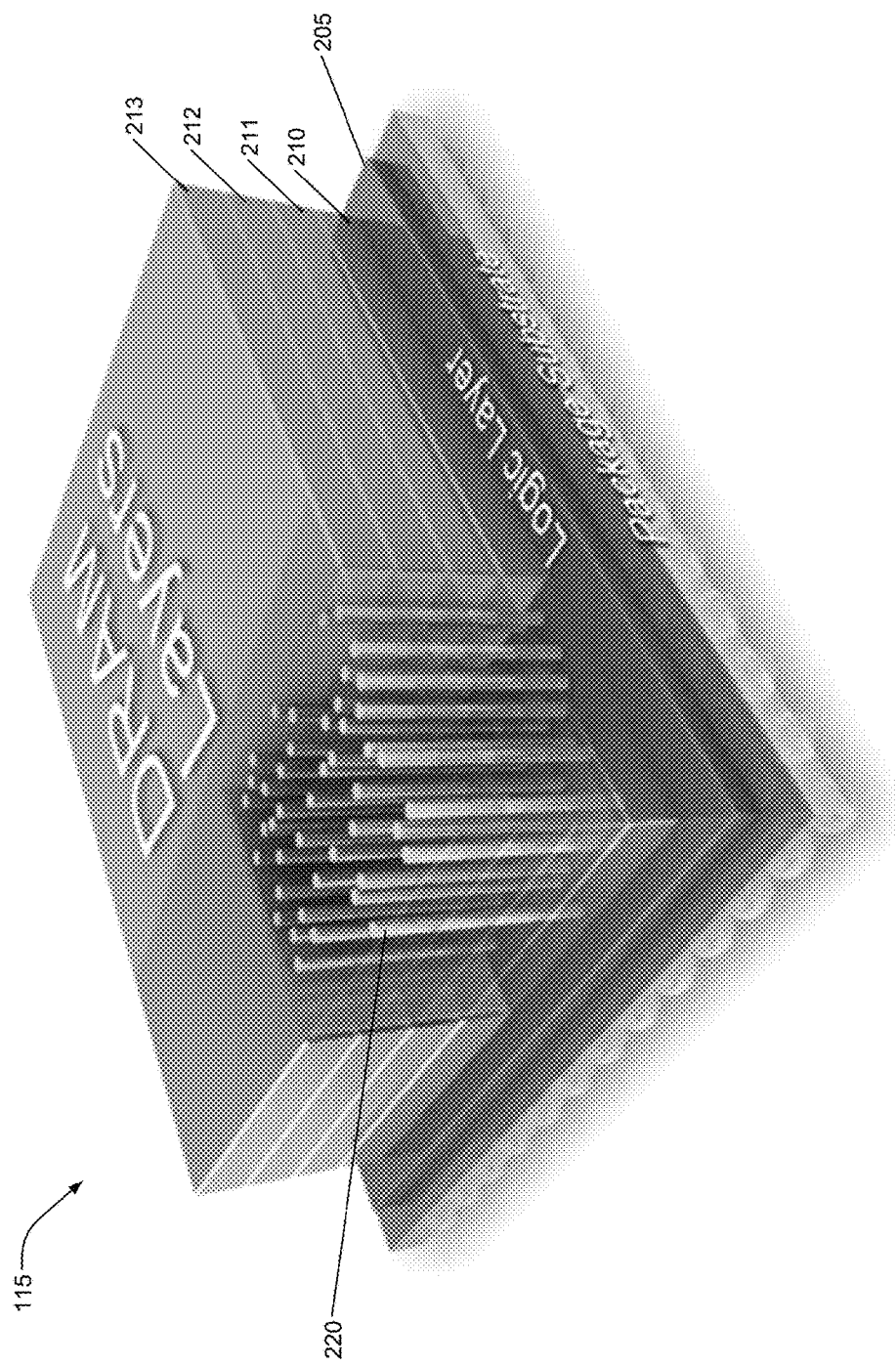
FIG. 2 is a graphical representation of an enhanced memory unit.

FIG. 2 is a graphical representation of an example embodiment of enhanced memory unit 115. Enhanced memory unit 115 is comprised of a plurality of layers of semiconductor material. In the preferred embodiment, the semiconductor material is silicon. One of the layers of the enhanced memory unit 115 is a logic layer 205. Logic layer 205 includes circuits configured to transmit packets to secure processor 105 and receive packets from secure processor 105 across communications bus 110. Storage layer 210 is the semiconductor layer directly above logic layer 205 and contains circuits configured as dynamic random access memory (DRAM). In some embodiments, enhanced memory unit 115 includes multiple layers of semiconductor material configured as DRAM, for example, layer 211, layer 212, and layer 213. Logic layer 205 is connected to the layers configured as DRAM (e.g. 201, 211, 212, and 213) by means of through-silicon vias. Element 220 is an example of a through-silicon via that connects logic layer 205 to storage layers 210, 211 212, and 213. In one embodiment, enhanced memory unit is a modified HMC. The specifications of the HMC are detailed in "Hybrid Memory Cube Specification 2.1" published by the Hybrid Memory Cube Consortium (www.hybridmemorycube.org/files/SiteDownloads/HMC-30G-VSR_HMCC_Specification_Rev2.1_20151105.pdf), which is incorporated by reference. Although specific examples of enhanced memory unit 115 have been provided, the present disclosure contemplates the use of other memory units in trusted computing system 100. Such systems fall within the scope of the presently disclosed invention.

Figure 3:
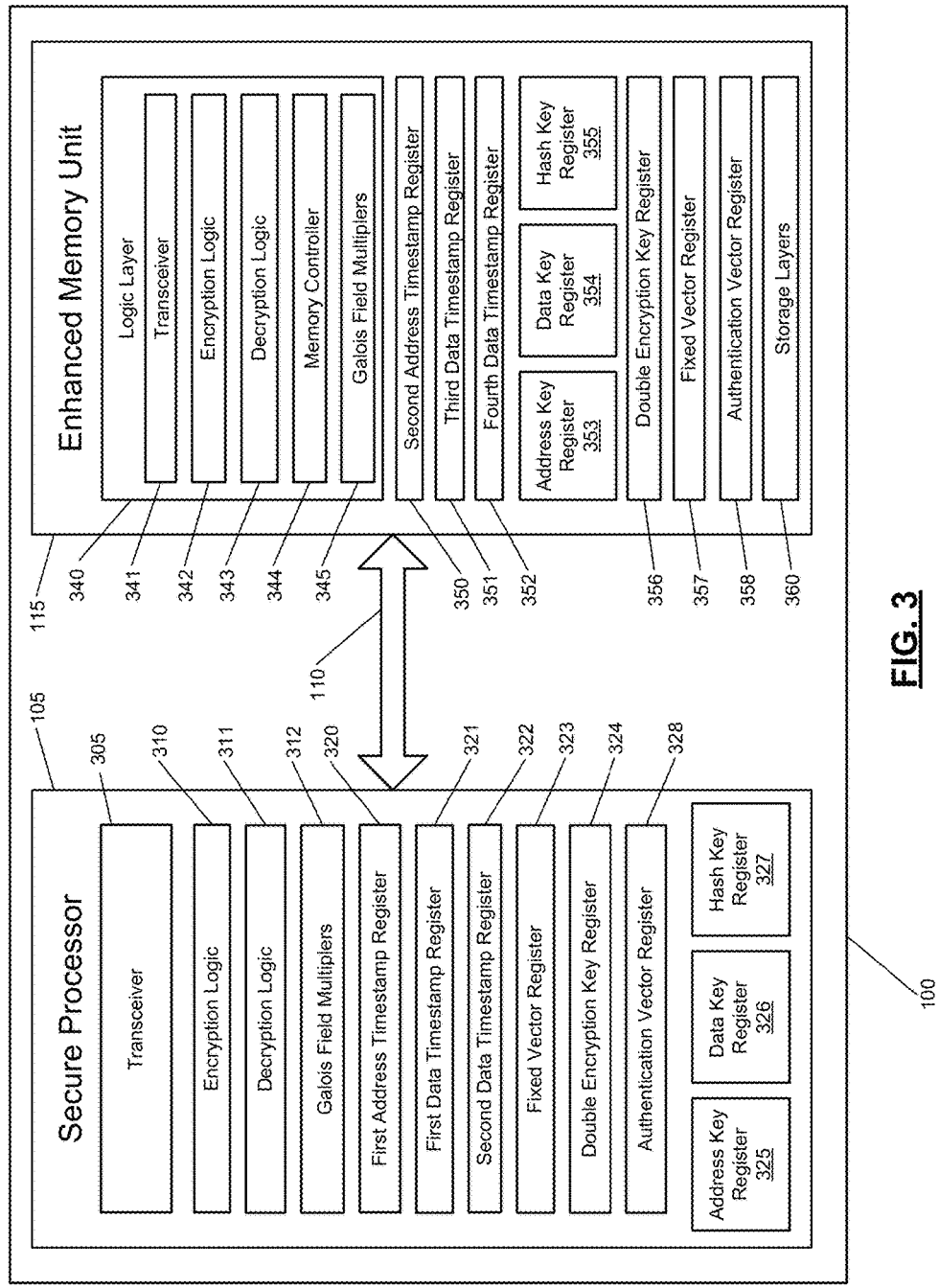
FIG. 3 is functional block diagram of the secure processor in communication with the enhanced memory unit according to the principles of the present disclosure.

FIG. 3 is a functional block diagram of an example embodiment of trusted computing system 100. Secure processor 105 includes a transceiver 305 that transmits and receives packets over communications bus 110. Secure processor 105 also includes encryption logic 310 and decryption logic 311. Encryption logic 310 encrypts the contents of a packet prior to transmitting the packet to enhanced memory unit 115. Decryption logic 311 decrypts the contents of a packet received from enhanced memory unit 115. Secure processor 105 further includes Galois field multipliers 312. Galois field multipliers 312 are used to generate authentication data for encrypted content.

Secure processor 105 further includes a first address timestamp register 320, a first data timestamp register 321, and a second data timestamp register 322. Secure processor 105 also includes fixed vector register 323, double encryption key register 324, address key register 325, data key register 326, hash key register 327, and authentication vector register 328. These registers are used by secure processor 105 to encrypt and decrypt packet contents. Although FIG. 3 discloses a configuration of secure processor 105 according to an example embodiment, other configurations and arrangements are contemplated and fall within the scope of the presently disclosed invention.

In one embodiment, first address timestamp register 320 stores a 128-bit timestamp value. First data timestamp register 321 stores a 64-bit timestamp value and second data timestamp register 322 stores a 125-bit timestamp value.

Enhanced memory unit 115 includes logic layer 340 and storage layers 360. Logic layer 340 includes transceiver 341 that transmits and receives packets over communications bus 110. Logic layer 340 also includes encryption logic 342 and decryption logic 343. Encryption logic 342 encrypts the contents of packets prior to transmitting the packets to secure processor 105. Decryption logic 343 decrypts the contents of packets received from secure processor 105. Further, logic layer 340 includes Galois field multipliers 345. Galois field multipliers 345 are used to generate authentication data for encrypted content.

Enhanced memory unit 115 includes second address timestamp register 350, third data timestamp register 351, and fourth data timestamp register 352. Enhanced memory unit 115 also includes address key register 353, data key register 354, hash key register 355, double encryption key register 356, fixed vector register 357, and authentication vector register 358. These registers are used by decryption logic 343 and encryption logic 342 to decrypt and encrypt packet contents. In an example embodiment, the registers are located within logic layer 340. In other embodiments, the registers are located within the storage layers 360.

In one embodiment, second address timestamp register 350 stores a 128-bit timestamp value. Third data timestamp register 351 stores a 64-bit timestamp value and fourth data timestamp register 352 stores a 125-bit timestamp value.

Storage layers 360 include circuits configured as dynamic access memory (DRAM). Logic layer 340 includes memory controller 344. Memory controller 344 includes logic configured to communicate with the DRAM in storage layers 360. Specifically, memory controller 344 reads from, and writes to, the DRAM. Memory controller 344 also refreshes the DRAM in storage layers 360. Memory controller 344 communicates with the DRAM through standard double data rate (DDR) commands. Although FIG. 3 discloses a configuration of enhanced memory unit 115 according to an example embodiment, other configurations and arrangements are contemplated and fall within the scope of the presently disclosed invention.

Secure processor 105 and enhanced memory unit 115 communicate through a secure communications channel over communications bus 110. Establishing the secure communications channel requires the sharing of cryptographic keys and the synchronization of registers. Prior to establishing secure communications with enhanced memory unit 115, secure processor 105 generates a random 62-bit binary number and a random 128-bit binary number and then stores the generated numbers in fixed vector register 323 and authentication vector register 328, respectively. Enhanced memory unit 115 has a unique public-private key pair (Public Key Infrastructure or PKI). To initiate remote computation, secure processor 105 uses the public key of enhanced memory unit 115 to encrypt and transmit a plurality of encryption keys to enhanced memory unit 115. The plurality of encryption keys includes an address encryption key ($K_a$), a data encryption key ($K_d$), a data double encryption key ($K_{d-de}$), and a hash key ($K_h$). The address key is used to encrypt memory addresses and is stored in address key register 325 and address key register 353. The data encryption key is used to encrypt data and is stored in data key register 326 and data key register 354. The data double encryption key is used to encrypt data and associated meta-data and is stored in double encryption key register 324 and double encryption key register 356. The hash key is used by the Galois field multipliers and is stored in hash key register 327 and hash key register 355. Secure processor 105 also uses the public key of enhanced memory unit 115 to synchronize first address timestamp register 320, first data timestamp register 321, second data timestamp register 322, fixed vector register 323, and authentication vector register 328 with second address timestamp register 350, third data timestamp register 351, fourth data timestamp register 352, fixed vector register 357, and authentication vector register 358, respectively. After synchronization, the respective registers in secure processor 105 and enhanced memory unit 115 will store the same values.

In an example embodiment, encryption logic 310 and decryption logic 311 of secure processor 105 and encryption logic 342 and decryption logic 343 of enhanced memory unit 115 use the Galois/Counter operation mode (GCM) with Advanced Encryption Standard (AES) encryption to encrypt and decrypt both addresses and data. GCM with AES encryption is described in "The Galois/Counter Mode of Operation (GCM)" by David A. McGrew and John Viega (csrc.nist.gov/groups/ST/toolkit/BCM/documents/proposedmodes/gcm/gcm-spec.pdf), which is incorporated by reference. Encryption logic 310 and decryption logic 311 of secure processor 105 and encryption logic 342 and decryption logic 343 of enhanced memory unit 115 generate one time pads (OTPs) using a timestamp value and an encryption key. As noted above, respective timestamp registers in both secure processor 105 and enhanced memory unit 115 are synchronized at the start of a program's execution. Thereafter, secure processor 105 and enhanced memory unit 115 synchronously increment the appropriate timestamp register upon sending or receiving a packet. The use of synchronous timestamp registers avoids the need to include timestamp data in every packet. More importantly, encryption logic 310 and decryption logic 311 of secure processor 105 and encryption logic 342 and decryption logic 343 of enhanced memory unit 115 can pre-compute an OTP even before a packet is ready to be encrypted or decrypted. The only case where this is not possible is when decryption logic 311 of secure processor 105 decrypts a read response, as the timestamp stored with the data must first be decrypted in order to generate the OTP necessary to decrypt the data. Synchronous timestamps are feasible because communication bus 110 is a point-to-point communications link between secure processor 105 and enhanced memory unit 115, and is generally lossless. If the communication link between secure processor 105 and enhanced memory unit 115 becomes unreliable, the timestamp registers can lose synchronization when a packet is lost. Unreliable communications networks deal with lost messages by tagging packets with sequence numbers, and resynchronizing when a packet loss is detected. The same technique can be used to track lost packets in trusted computing system 100.

Trusted computing system 100 also uses GCM to generate authentication tags for encrypted addresses and encrypted data. In an example embodiment, secure processor 105 uses Galois field multipliers 312 to generate authentication tags and enhanced memory unit 115 uses Galois field multipliers 343 to generate authentication tags. Galois field multipliers 312 of secure processor 105 perform Galois Field Multiplication (GFM) operations on inputted values by multiplying the inputted value by the value of the hash key ($K_h$) stored in hash key register 327. Similarly, Galois field multipliers 345 of enhanced memory unit 115 perform GFM operations on inputted values by multiplying the inputted value by the value of the hash key ($K_h$) stored in hash key register 355. The authentication tags are used to guarantee both that the encrypted content originated from either secure processor 105 or enhanced memory unit 115 and that the content has not been altered. Since trusted computing system 100 uses authentication tags to guarantee the freshness of transmitted and stored data, trusted computing system 100 does not implement costly Merkle trees. Although the example embodiment of trusted computing system 100 discloses using GCM with AES encryption, other similar and/or analogous algorithms may be used and fall within the scope of the presently disclosed invention.

Figure 4:
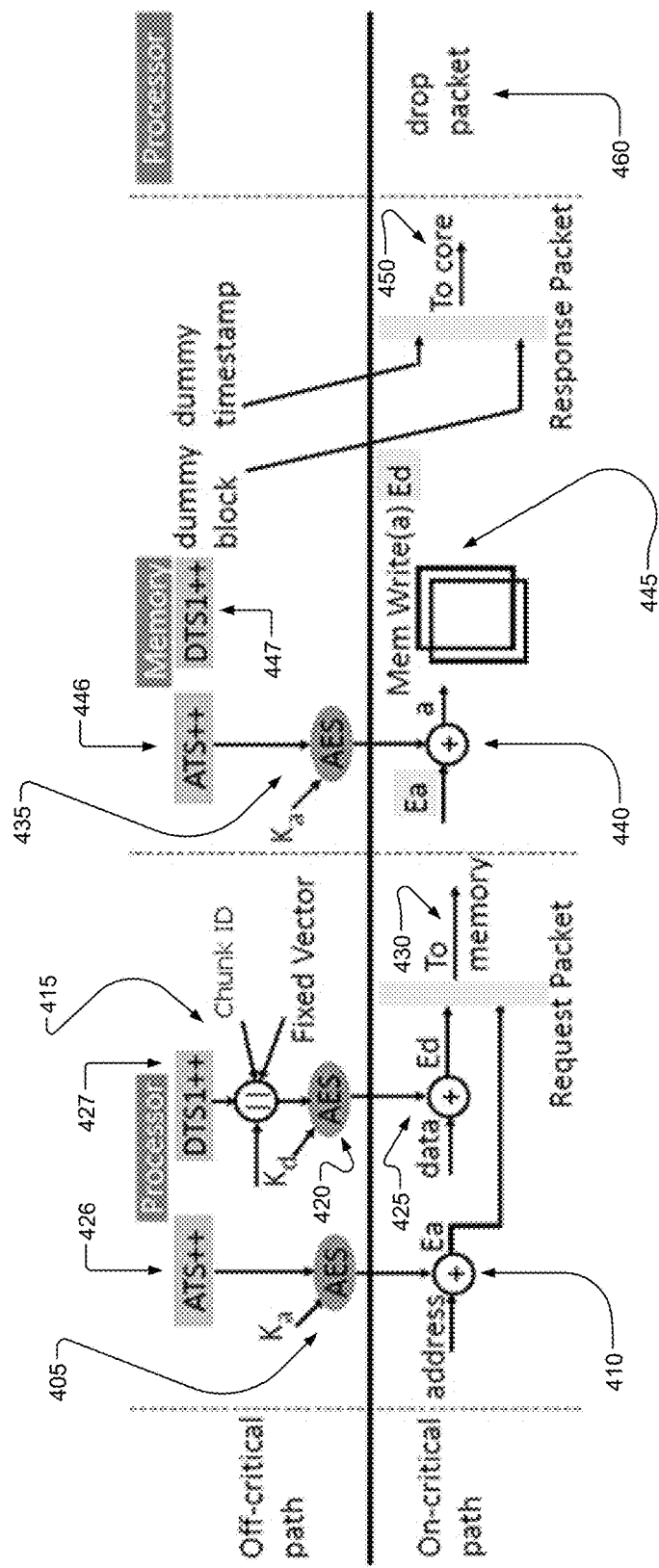
FIG. 4 is a diagram showing a simplified procedure for executing a write operation according to the principles of the present disclosure.

FIG. 4 shows the steps taken by an example embodiment of trusted computing system 100 to process a write operation. The process begins when secure processor 105 executes a write operation that includes a 64-byte block of data to be written to a memory address associated with enhanced memory unit 115. Encryption logic 310 of secure processor 105 encrypts address information by performing an exclusive OR (XOR) operation 410 on the address information and an address OTP. The address information includes the memory address associated with the enhanced memory unit 115 and command information indicating a write operation. The address OTP is generated by performing AES encryption 405 on the value of the first address timestamp register 320 and the address encryption key ($K_a$) stored in address key register 325.

Figure 6:
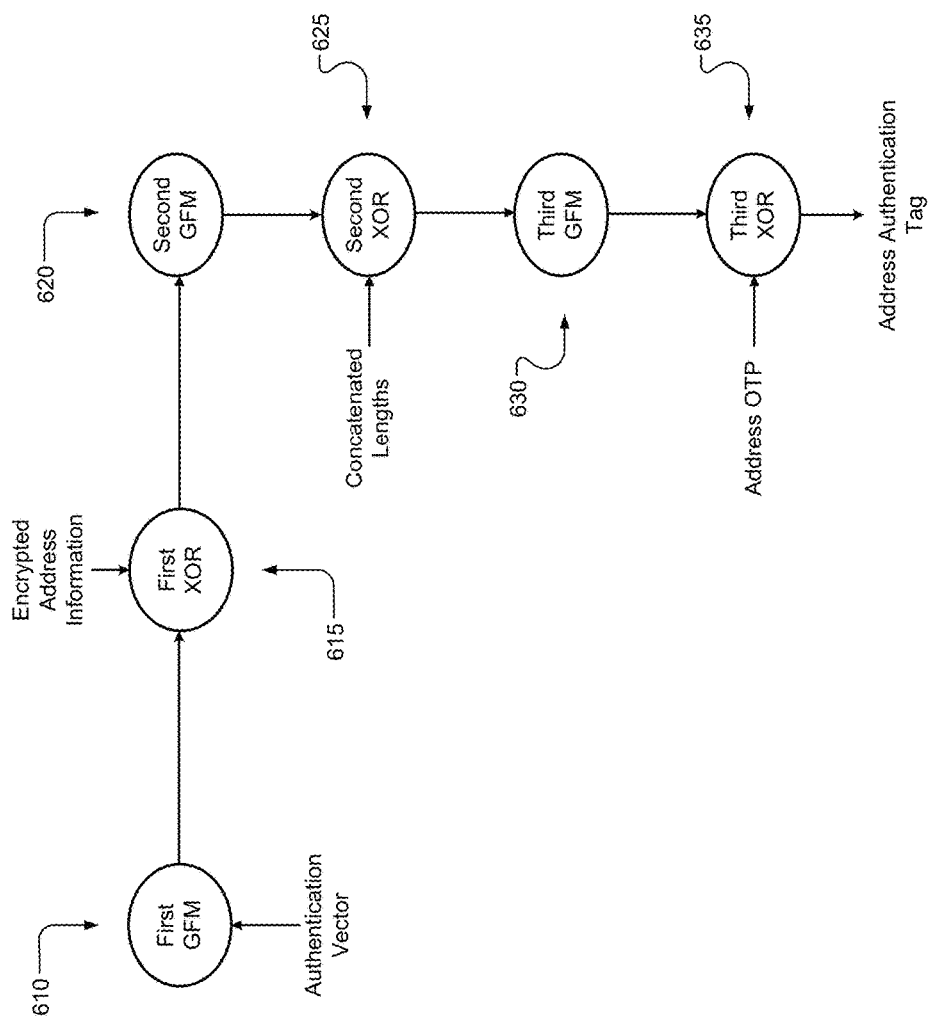
FIG. 6 is an algorithm for calculating an address authentication tag according to the principles of the present disclosure.

Secure processor 105 then generates an authentication tag for the encrypted address information using Galois field multipliers 312. FIG. 6 discloses an algorithm for generating address authentication tags. After the address information has been encrypted, secure processor 105 performs a first GFM operation 610 on the value of the authentication vector stored in authentication vector register 328. Secure processor 105 then performs a first XOR operation 615 on the encrypted address information and the result of the first GFM operation 610. Next, secure processor 105 performs a second GFM operation 620 on the result of the first XOR operation 615. Secure processor 105 then performs a second XOR operation 625 on the result of the second GFM operation 620 and a concatenated lengths value. The concatenated lengths value is generated by concatenating a 64-bit representation of the number of bits in the encrypted address information, e.g. 128, with a 64-bit representation of the number of bits in the authentication vector, e.g. 128. Next, secure processor 105 performs a third GFM operation 630 on the result of the second XOR operation 625. Last, secure processor 105 performs a third XOR operation 635 on the result of the third GFM operation 630 and the address OTP. The result of the third XOR operation 635 is the address authentication tag.

Returning to FIG. 4, secure processor 105 then breaks the 64-byte block of data into four 128-bit memory chunks: a first memory chunk, a second memory chunk, a third memory chunk, and a fourth memory chunk. Each memory chunk is assigned a different two bit binary chunk ID. For example, the first memory chunk is assigned the chunk ID "00", the second memory chunk is assigned the chunk ID "01", the third memory chunk is assigned the chunk ID "10", and the fourth memory chunk is assigned the chunk ID "11".

Encryption logic 310 of secure processor 105 then encrypts the four memory chunks. The first memory chunk is encrypted by performing an XOR operation 425 on the first memory chunk and a first chunk OTP. The second memory chunk is encrypted by performing an XOR operation 425 on the second memory chunk and a second chunk OTP. The third memory chunk is encrypted by performing an XOR operation 425 on the third memory chunk and a third chunk OTP. The fourth memory chunk is encrypted by performing an XOR operation 425 on the fourth memory chunk and a fourth chunk OTP.

Encryption logic 310 generates the first chunk OTP by concatenating 415 the value of first data timestamp register 321, the value of fixed vector register 323, and the first chunk ID, i.e. "00". Then, encryption logic 310 performs AES encryption 420 on the data encryption key ($K_d$) stored in data key register 326 and the result of the concatenation. The first chuck OTP is the result of the AES encryption. Encryption logic 310 generates the second chunk OTP, the third chunk OTP, and the fourth chunk OTP in a similar fashion by concatenating 415 the value of first data timestamp register 321, the value of fixed vector register 323, and the respective chunk ID and then performing AES encryption 420 on the resultant value and $K_d$. Since secure processor 105 always breaks data blocks to be written into four 128-bit memory chunks when executing a write operation, encryption logic 310 generates all of the necessary OTPs prior to executing a write operation. In other words, the necessary OTPs are pre-computed.

Figure 7:
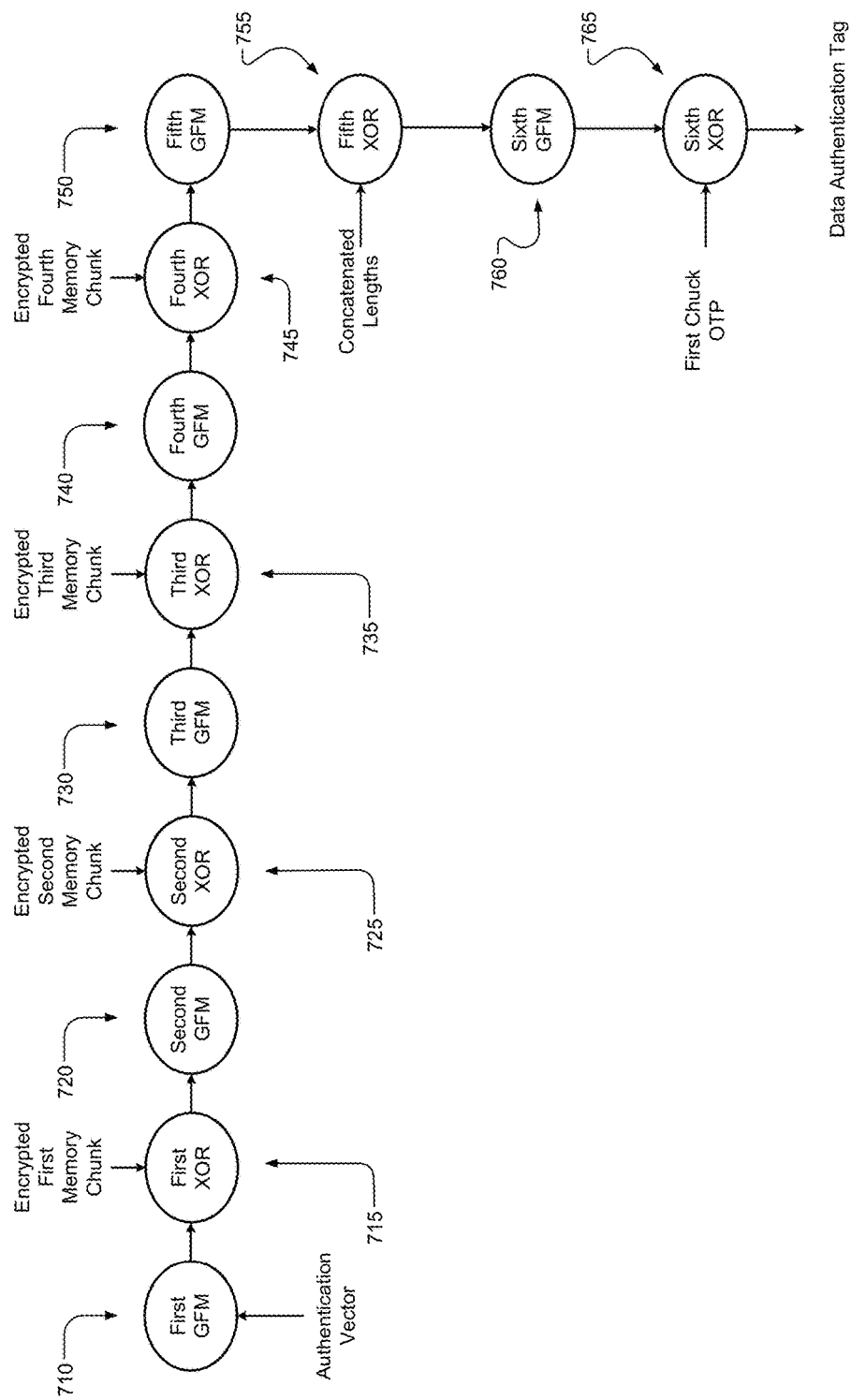
FIG. 7 is an algorithm for calculating a data authentication tag according to the principles of the present disclosure.

Secure processor 105 then generates an authentication tag for the encrypted data using Galois field multipliers 312. FIG. 7 discloses an algorithm for generating data authentication tags. Secure processor 105 begins by performing a first GFM operation 710 on the value of the authentication vector stored in authentication vector register 328. Secure processor 105 then performs a first XOR operation 715 on the encrypted first memory chunk and the result of the first GFM operation 710. Next, secure processor 105 performs a second GFM operation 720 on the result of the first XOR operation 715. Secure processor 105 then performs a second XOR operation 725 on the encrypted second memory chunk and the result of the second GFM operation 720. Secure processor 105 performs a third GFM operation 730 on the result of the second XOR operation 725. Next, secure processor 105 performs a third XOR operation 735 on the encrypted third memory chunk and the result of the third GFM operation 730 and then performs a fourth GFM operation 740 on the result of the third XOR operation 735. Then, secure processor 105 performs a fourth XOR operation 745 on the encrypted fourth memory chunk and the result of the fourth GFM operation 740. Secure processor 105 performs a fifth GFM operation 750 on the result of the fourth XOR operation 745. Next, secure processor 105 performs a fifth XOR operation 755 on the result of the fifth GFM operation 750 and a concatenated lengths value. The concatenated lengths value is generated by concatenating a 64-bit representation of the total number of bits in the four encrypted memory chucks, e.g. 512, with a 64-bit representation of the number of bits in the authentication vector, e.g. 128. Secure processor 105 then performs a sixth GFM operation 760 on the result of the fifth XOR operation 755. Last, the secure process performs a sixth XOR operation 765 on the result of the sixth GFM operation 760 and the first chunk OTP. The result of the sixth XOR operation 765 is the data authentication tag.

Returning to FIG. 4, after encryption logic 310 has encrypted the address information and secure processor 105 has generated the address authentication tag, secure processor 105 increments the value of the first address timestamp by one 426 and stores the resultant value in first address timestamp register 320. After encryption logic 310 encrypts the four memory chunks and secure processor 105 has generated the data authentication tag, secure processor 105 increments the value of the first data timestamp by one 427 and stores the resultant value in first data timestamp register 321. Secure processor 105, using transceiver 305, then transmits a write request packet 430 to enhanced memory unit 115. The write request packet includes the encrypted address information, the four encrypted memory chunks, the address authentication tag, and the data authentication tag.

On receipt of a write request packet, enhanced memory unit 115 attempts to authenticate the packet. Using Galois field multipliers 345 and the authentication vector stored in authentication vector register 358, enhanced memory unit 115 performs the algorithm disclosed in FIG. 6, as previously described, to generate an authentication tag for the received encrypted address information. Enhanced memory unit 115 then compares the generated authentication tag to the address authentication tag in the write request packet. Using Galois field multipliers 345 and the authentication vector stored in authentication vector register 358, enhanced memory unit 115 performs the algorithm disclosed in FIG. 7, as previously described, to generate an authentication tag for the received encrypted data. Enhanced memory unit 115 then compares the generated authentication tags to the authentication tags in the write request packet. If the generated authentication tags match the authentication tags in the write request packet, enhanced memory unit 115 authenticates the write request packet. If the generated authentication tags do not match the authentication tags in the write request packet, enhanced memory unit 115 does not authenticate the packet.

If enhanced memory unit 115 authenticates the write request packet, decryption logic 343 decrypts the address information using an address OTP. Enhanced memory unit 115 generates the address OTP by performing AES encryption 435 on the value of second address timestamp register 350 and $K_a$ stored in address key register 353. Decryption logic 343 decrypts the address information by performing an XOR operation 440 on the encrypted address information and the address OTP. Next, memory controller 344 of enhanced memory unit 115 issues a write command to write 445 the encrypted data, the data authentication tag, and the value of the third data timestamp register to DRAM, for example the DRAM in storage layers 360. Then, enhanced memory unit 115 increments both the second address timestamp 446 and the third data timestamp 447 by one and stores the resultant values in the second address timestamp register 350 and third data timestamp register 351, respectively.

After memory controller 344 completes the write 445 to DRAM or if enhanced memory unit 115 does not authenticate the packet, enhanced memory unit 115, using transceiver 341, transmits a dummy response packet 450 to secure processor 105. To transmit a dummy response packet, enhanced memory unit 115 first uses encryption logic 342 to encrypt address information that includes command information. The included command information indicates that the packet is a dummy response packet. Encryption logic 342 encrypts the address information by performing an XOR operation on the address information and an address OTP. The address OTP is generated using the value stored in second address timestamp register 350 and the address encryption key ($K_a$) stored in address key register 353 using AES encryption. Enhanced memory unit 115, using Galois field multipliers 345 and the authentication vector stored in authentication vector register 358, performs the algorithm disclosed in FIG. 6 to generate an authentication tag for the encrypted address information.

Enhanced memory unit 115 then generates 64 bytes of random data. Enhanced memory unit 115 divides the 64 bytes of random data into four 128-bit blocks: a first block, a second block, a third block, and a fourth block. Each block is assigned a different three bit binary block ID. For example, the block ID of the first block is "000", the block ID of the second block is "001", the block ID of the third block is "010", and the block ID of the fourth block is "011". Next, enhanced memory unit 115 generates 8 bytes of random data and places it into a fifth block assigned the block ID "100".

Encryption logic 342 of enhanced memory unit 115 then encrypts the five blocks of random data to create dummy encrypted data. The first block is encrypted by performing an XOR operation on the first block and a first block OTP. The second block is encrypted by performing an XOR operation on the second block and a second block OTP. The third block is encrypted by performing an XOR operation on the third block and a third block OTP. The fourth block is encrypted by performing an XOR operation on the fourth block and a fourth block OTP. The fifth block is encrypted by performing an XOR operation on the fifth block and a fifth block OTP.

Encryption logic 342 generates the first block OTP by concatenating the value of fourth data timestamp register 352 with the first block ID, i.e. "000". Then, encryption logic 342 performs AES encryption on the data double encryption key ($K_{d\text{-}de}$) stored in double encryption key register 356 and the result of the concatenation. The first block OTP is the result of the AES encryption. Encryption logic 342 generates the second block OTP, the third block OTP, and the fourth block OTP in a similar fashion by concatenating the value of fourth data timestamp register 352 with the respective block ID and then performing AES encryption on the resultant value and $K_{d\text{-}de}$. Encryption logic 342 generates the fifth block OTP by concatenating the value of fourth data timestamp register 352 with the fifth block ID, i.e. "100" and then performing AES encryption on the resultant value and $K_{d\text{-}de}$. The fifth block OTP is the 64 most significant bits of the result of this AES encryption. The block OTPs may be pre-computed.

Figure 8:
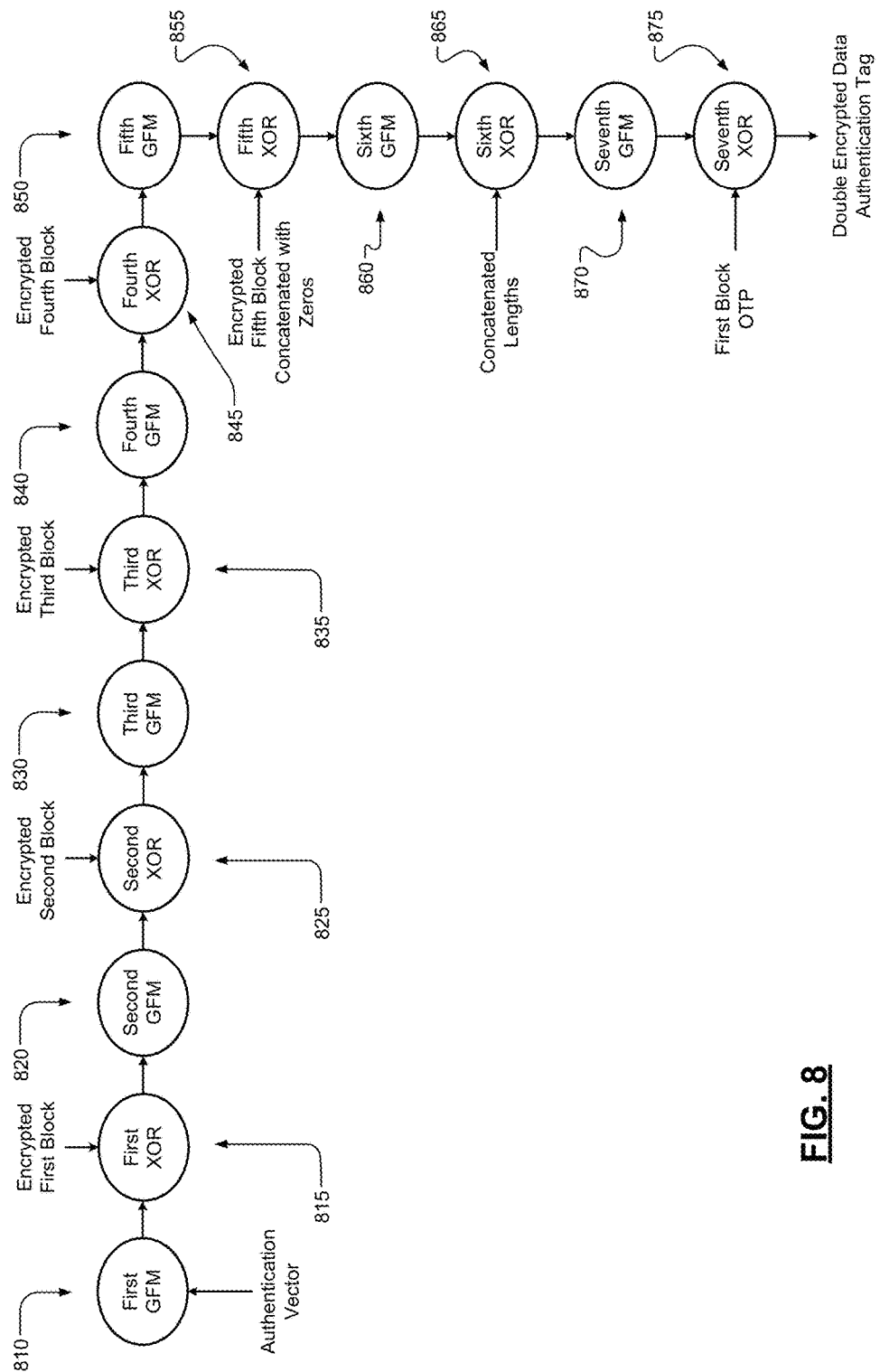
FIG. 8 is an algorithm for calculating a double encrypted data authentication tag according to the principles of the present disclosure.

Enhanced memory unit 115 then generates an authentication tag for the dummy encrypted data. FIG. 8 shows the algorithm for generating an authentication tag for data that has been encrypted using $K_{d\text{-}de}$. To create a dummy data authentication tag, enhanced memory unit 115 begins by performing a first GFM operation 810 on the authentication vector stored in authentication vector register 358. Enhanced memory unit 115 then performs a first XOR operation 815 on the encrypted first block and the result of the first GFM operation 810. Next, enhanced memory unit 115 performs a second GFM operation 820 on the result of the first XOR operation 815. Enhanced memory unit 115 then performs a second XOR operation 825 on the encrypted second block and the result of the second GFM operation 820. Enhanced memory unit 115 performs a third GFM operation 830 on the result of the second XOR operation 825. Next, enhanced memory unit 115 performs a third XOR operation 835 on the encrypted third block and the result of the third GFM operation 830 and then performs a fourth GFM operation 840 on the result of the third XOR operation 835. Then enhanced memory unit 115 performs a fourth XOR operation 845 on the encrypted fourth block and the result of the fourth GFM operation 840. Enhanced memory unit 115 performs a fifth GFM operation 850 on the result of the fourth XOR operation 845. Enhanced memory unit 115 performs a fifth XOR operation 855 on the encrypted fifth block concatenated with 64 zeros and the result of the fifth GFM operation 850. Enhanced memory unit 115 performs a sixth GFM operation 860 on the result of the fifth XOR operation 855. Next, enhanced memory unit 115 performs a sixth XOR operation 865 on the result of the sixth GFM operation 860 and a concatenated lengths value. The concatenated lengths value is generated by concatenating a 64-bit representation of the total number of bits in the five encrypted blocks, e.g. 576, with a 64-bit representation of the number of bits in the authentication vector, e.g. 128. Enhanced memory unit 115 then performs a seventh GFM operation 870 on the result of the sixth XOR operation 865. Last, enhanced memory unit 115 performs a seventh XOR operation 875 on the result of the seventh GFM operation 870 and the first block OTP. The result of the seventh XOR operation 875 is the dummy data authentication tag.

After encryption logic 342 creates the dummy encrypted data and enhanced memory unit 115 generates the dummy data authentication tag, enhanced memory unit 115 increments both the second address timestamp and the fourth data timestamp by one and stores the resultant values in the second address timestamp register 350 and fourth data timestamp register 352, respectively. Then, using transceiver 341, enhanced memory unit 115 transmits the dummy response packet 550 to secure processor 105. The dummy response packet includes the dummy encrypted data, the dummy data authentication tag, the encrypted address information, and the address authentication tag.

Upon receipt of the dummy response packet, secure processor 105 authenticates the encrypted address information. Using Galois field multipliers 312, the authentication vector stored in authentication vector register 328, and the value of the first address timestamp register, secure processor 105 performs the algorithm disclosed in FIG. 6 to generate an authentication tag for the received encrypted address information, as described above. Secure processor 105 then compares the generated authentication tag to the address authentication tag in the read response packet. If the two values are equal, secure processor 105 authenticates the received address information.

Once secure processor 105 authenticates the received address information, decryption logic 311 decrypts the address information using an address OTP based on the value of first address timestamp register 320 and $K_a$ stored in address key register 325. Decryption logic 311 decrypts the address by performing an XOR operation on the encrypted address and a pre-computed address OTP.

After the address information is decrypted, secure processor 105 increments the value of the first address timestamp by one and stores the resultant value in first address timestamp register 320. Secure processor 105 then drops the response packet based on command information included within the address information indicating that the response is a dummy response. In other words, secure processor 105 does not attempt to authenticate or decrypt the random data included in the dummy response packet. After the dummy response packet has been dropped, secure processor 105 increments the value of the second data timestamp by one and stores the resultant value in second data timestamp register 322.

Figure 5:
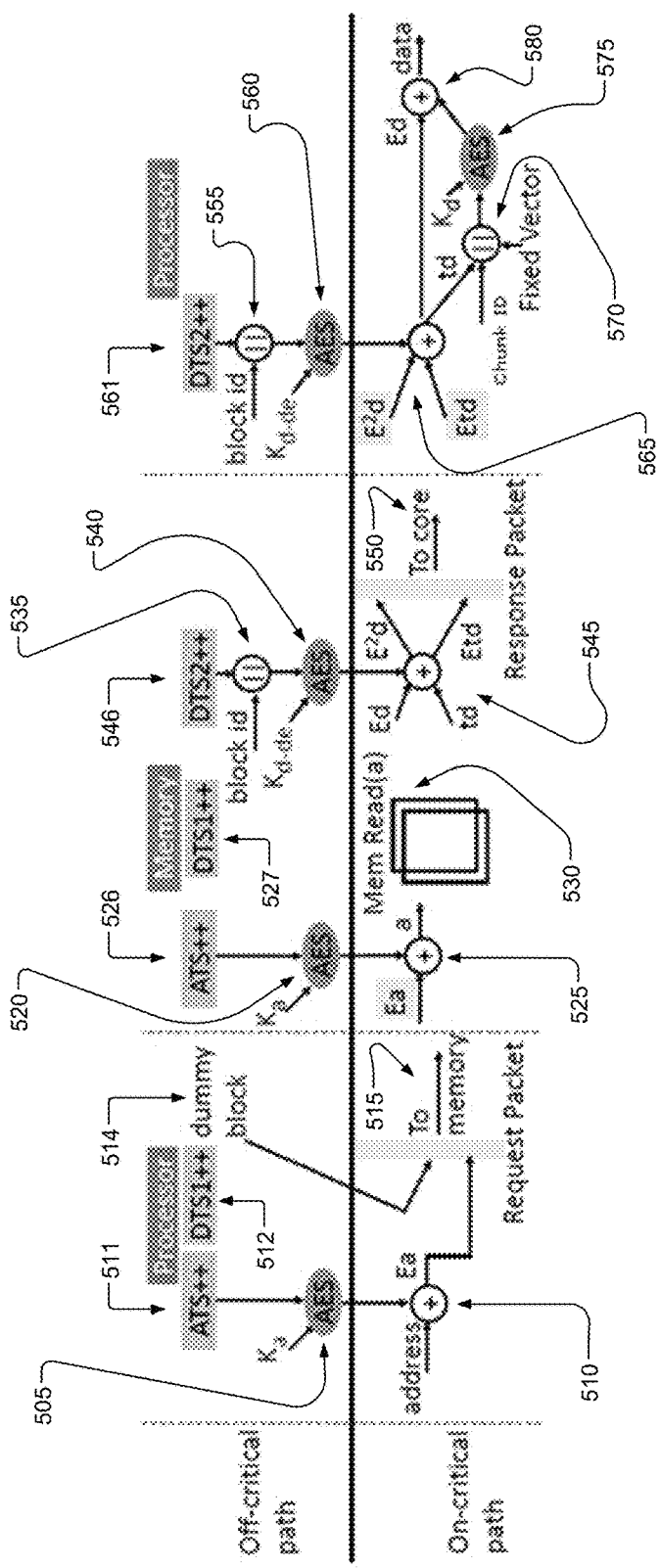
FIG. 5 is a diagram showing a simplified procedure for executing a read operation according to the principles of the present disclosure.

FIG. 5 shows the steps taken by an example embodiment of trusted computing system 100 to process a read operation. The process begins when secure processor 105 executes a read operation that includes a memory address associated with enhanced memory unit 115. Encryption logic 310 of secure processor 105 encrypts address information by performing an XOR operation 510 on the address information and an address OTP. The address information includes the memory address associated with the enhanced memory unit 115 and command information indicating a read operation. The address OTP is generated using the value stored in first address timestamp register 320 and the address encryption key ($K_a$) stored in address key register 325 using AES encryption 505.

Secure processor 105 then generates an authentication tag for the encrypted address information using Galois field multipliers 312. Secure processor 105 generates the address authentication tag by performing the algorithm shown in FIG. 6, as described above. After the address information is encrypted and the address authentication tag is generated, secure processor 105 increments the value of the first address timestamp by one 511 and stores the resultant value in first address timestamp register 320.

Next, secure processor 105 generates 64-bytes of random data. Secure processor 105 then breaks the 64-bytes of random data into four 128-bit memory chunks, wherein each memory chunk is assigned a different two bit binary chunk ID. Encryption logic 310 of secure processor 105 then encrypts the four memory chunks using pre-computed OTPs, as described above, to create dummy encrypted data. Secure processor 105 then generates a dummy data authentication tag for the dummy encrypted data using Galois field multipliers 312. Secure processor 105 generates the dummy data authentication tag by performing the algorithm shown in FIG. 7, as described above.

Returning to FIG. 5, after the randomly generated data is encrypted and the dummy data authentication tag is generated, secure processor 105 increments the value of the first data timestamp by one 512 and stores the resultant value in first data timestamp register 321. Secure processor 105 then uses transceiver 305 to transmit a read request packet 515 to enhanced memory unit 115. The read request packet includes the encrypted address information, the address authentication tag, the dummy encrypted data, and the dummy data authentication tag. Secure processor 105 adds dummy encrypted data and an associated dummy data authentication tag 514 to every read request packet sent to enhanced memory unit 115 so that all read request packets and all write request packets are equal in size. Since read and write request packets are identical in size, it is impossible for an attacker to differentiate a read request packet from a write request packet.

On receipt of a read request packet, enhanced memory unit 115 attempts to authenticate the packet. Using Galois field multipliers 345 and, the authentication vector stored in authentication vector register 358, enhanced memory unit 115 performs the algorithm disclosed in FIG. 6, as described above, to generate an authentication tag for the received encrypted address information. Enhanced memory unit 115 then compares the generated authentication tag to the address authentication tag in the read request packet. If the two values are equal, enhanced memory unit 115 uses decryption logic 343 to decrypt the address info. If the two values are not equal, enhanced memory unit 115 does not authenticate the packet.

Decryption logic 343 uses an address OTP generated 520 based on the value of second address timestamp register 350 and $K_a$ stored in address key register 353 to decrypt the address information. Decryption logic 343 decrypts the address information by performing an XOR operation 525 on the encrypted address information and the address OTP. After the address is decrypted, enhanced memory unit 115 increments the second address timestamp by one 526 and stores the resultant value in second address timestamp register 350.

Enhanced memory unit 115 determines that the request packet is a read request pack based on the command information included in the address information and ignores the dummy encrypted data and an associated dummy data authentication tag. Enhanced memory unit 115 then increments the third data timestamp by one 527 and stores the resultant value in third data timestamp register 351.

Memory controller 344 of enhanced memory unit 115 then issues a read command 530 to DRAM, e.g. the DRAM in storage layers 360. On receiving a response from DRAM that includes both the data stored at the address included in the read request packet and meta-data (i.e. timestamp data and data authentication tag) associated with the data, enhanced memory unit 115 tests the integrity of the retrieved encrypted data.

Enhanced memory unit 115 tests the integrity of the retrieved encrypted data by generating a data authentication tag for the retrieved data and comparing it to the associated data authentication tag retrieved from DRAM. Using Galois field multipliers 345, the authentication vector stored in authentication vector register 358, and the value of fixed vector register 357, enhanced memory unit 115 performs the algorithm disclosed in FIG. 7, as described above, to generate the data authentication tag. If the generated data authentication tag matches the retrieved associated data authentication tag, enhanced memory unit 115 verifies the integrity of the retrieved data.

If enhanced memory unit 115 verifies the integrity of the retrieved data, enhanced memory unit 115 encrypts the data and the associated timestamp data. Enhanced memory unit 115 begins by dividing the retrieved data into four 128-bit blocks: a first block, a second block, a third block, and a fourth block. Each block is assigned a different three bit binary block ID. For example, the block ID of the first block is "000", the block ID of the second block is "001", the block ID of the third block is "010", and the block ID of the fourth block is "011". Enhanced memory unit 115 places the associated timestamp data into a fifth block and assigns it the block ID "100".

Encryption logic 342 of enhanced memory unit 115 then encrypts the five blocks. The first block is encrypted by performing an XOR operation 545 on the first block and a first block OTP. The second block is encrypted by performing an XOR operation 545 on the second block and a second block OTP. The third block is encrypted by performing an XOR operation 545 on the third block and a third block OTP. The fourth block is encrypted by performing an XOR operation 545 on the fourth block and a fourth block OTP. The fifth block is encrypted by performing an XOR operation 545 on the fifth block and a fifth block OTP. This results in the retrieved data being double encrypted, since the data stored in the DRAM is encrypted data. Double encryption guards against correlation attacks that observe encrypted data or timestamps.

Encryption logic 342 generates the first block OTP by concatenating 535 the value of fourth data timestamp register 352 with the first block ID, i.e. "000". Then, encryption logic 342 performs AES encryption 540 on the data double encryption key ($K_{d\text{-}de}$) stored in double encryption key register 356 and the result of the concatenation. The first block OTP is the result of the AES encryption. Encryption logic 342 generates the second block OTP, the third block OTP, and the fourth block OTP in a similar fashion by concatenating 535 the value of fourth data timestamp register 352 with the respective block ID and then performing AES encryption 540 on the resultant value and $K_{d\text{-}de}$. Encryption logic 342 generates the fifth block OTP by concatenating the value of fourth data timestamp register 352 with the fifth block ID, i.e. "100" and then performing AES encryption on the resultant value and $K_{d\text{-}de}$. The fifth block OTP is the 64 most significant bits of the result of this AES encryption. Encryption logic 342 generates all of the block OTPs prior to enhanced memory unit 115 receiving a response from DRAM. In other words, the necessary OTPs are pre-computed.

Enhanced memory unit 115, using Galois field multipliers 345 and the authentication vector stored in authentication vector register 358, generates a double encrypted data authentication tag for the double encrypted data and associated timestamp data. FIG. 8 shows the algorithm for generating a double encrypted data authentication tag. Enhanced memory unit 115 begins by performing a first GFM operation 810 on the authentication vector stored in authentication vector register 358. Enhanced memory unit 115 then performs a first XOR operation 815 on the encrypted first block and the result of the first GFM operation 810. Next, enhanced memory unit 115 performs a second GFM operation 820 on the result of the first XOR operation 815. Enhanced memory unit 115 then performs a second XOR operation 825 on the encrypted second block and the result of the second GFM operation 820. Enhanced memory unit 115 performs a third GFM operation 830 on the result of the second XOR operation 825. Next, enhanced memory unit 115 performs a third XOR operation 835 on the encrypted third block and the result of the third GFM operation 830 and then performs a fourth GFM operation 840 on the result of the third XOR operation 835. Then enhanced memory unit 115 performs a fourth XOR operation 845 on the encrypted fourth block and the result of the fourth GFM operation 840. Enhanced memory unit 115 performs a fifth GFM operation 850 on the result of the fourth XOR operation 845. Enhanced memory unit 115 performs a fifth XOR operation 855 on the encrypted fifth block concatenated with 64 zeros and the result of the fifth GFM operation 850. Enhanced memory unit 115 performs a sixth GFM operation 860 on the result of the fifth XOR operation 855. Next, enhanced memory unit 115 performs a sixth XOR operation 865 on the result of the sixth GFM operation 860 and a concatenated lengths value. The concatenated lengths value is generated by concatenating a 64-bit representation of the total number of bits in the five encrypted blocks, e.g. 576, with a 64-bit representation of the number of bits in the authentication vector, e.g. 128. Enhanced memory unit 115 then performs a seventh GFM operation 870 on the result of the sixth XOR operation 865. Last, enhanced memory unit 115 performs a seventh XOR operation 875 on the result of the seventh GFM operation 870 and the first block OTP. The result of the seventh XOR operation 875 is the double encrypted data authentication tag.

Returning to FIG. 5, after the data and its associated timestamp data are encrypted, and the double encrypted data authentication tag is generated, enhanced memory unit 115 increments the value of the fourth data timestamp by one 546 and stores the resultant value in fourth data timestamp register 352. Encryption logic 342 then encrypts address information by performing an XOR operation on the address information and an address OTP. The address information includes the memory address associated with read request and command information indicating a read operation. The address OTP is generated using the value stored in second address timestamp register 350 and the address encryption key ($K_a$) stored in address key register 353 using AES encryption.

Encryption logic 342 then generates an authentication tag for the encrypted address information. Encryption logic 342 generates an address authentication tag by performing the algorithm shown in FIG. 6. For example, encryption logic 342 performs a first GFM operation 610 on the authentication vector stored in authentication vector register 358. Encryption logic 342 then performs a first XOR operation 615 on the encrypted address information and the result of the first GFM operation 610. Next, encryption logic 342 performs a second GFM operation 620 on the result of the first XOR operation 615. Encryption logic 342 then performs a second XOR operation 625 on result of the second GFM operation 620 and a concatenated lengths value. The concatenated lengths value is generated by concatenating a 64-bit representation of the number of bits in the encrypted address information, e.g. 128, with a 64-bit representation of the number of bits in the authentication vector, e.g. 128. Next, encryption logic 342 performs a third GFM operation 630 on the result of the second XOR operation 625. Last, encryption logic 342 performs a third XOR operation 635 on the result of the third GFM operation 630 and the address OTP. The result of the third XOR operation 635 is the address authentication tag. After the address information is encrypted and the address authentication tag is generated, enhanced memory unit 115 increments the value of the second address timestamp by one and stores the resultant value in second address timestamp register 350.

Returning to FIG. 5, enhanced memory unit 115, using transceiver 341, then transmits a read response packet 550 to secure processor 105. The read response packet includes the double encrypted data, the encrypted associated timestamp data, the double encryption authentication tag, the encrypted address information, and the address authentication tag.

If enhanced memory unit 115 does not authenticate the packet, enhanced memory unit 115 transmits a dummy response packet to secure processor 105, as described above. The dummy response packet includes dummy encrypted data, a dummy data authentication tag, encrypted address information, and an address authentication tag. Upon receipt of the dummy response packet, secure processor 105 authenticates the encrypted address information, as previously described. Once secure processor 105 authenticates the address information, decryption logic 311 decrypts the address information. After the address information is decrypted, secure processor 105 increments the value of the first address timestamp by one and stores the resultant value in first address timestamp register 320. Secure processor 105 then drops the response packet based on the command information in the address information indicating that the response is a dummy response. In other words, secure processor 105 does not attempt to authenticate or decrypt the random data included in the dummy response packet. After the dummy response packet has been dropped, secure processor 105 increments the value of the second data timestamp by one and stores the resultant value in second data timestamp register 322.

On receipt of a read response packet, secure processor 105 authenticates the encrypted address information. Using Galois field multipliers 312, the authentication vector stored in authentication vector register 328, and the value of the first address timestamp register 320, secure processor 105 performs the algorithm disclosed in FIG. 6 to generate an authentication tag for the received encrypted address information, as described above. Secure processor 105 then compares the generated authentication tag to the address authentication tag in the read response packet. If the two values are equal, secure processor 105 authenticates the received address information.

Once secure processor 105 authenticates the received address information, decryption logic 311 decrypts the address information using an address OTP based on the value of first address timestamp register 320 and $K_a$ stored in address key register 325. Decryption logic 311 decrypts the address by performing an XOR operation on the encrypted address and a pre-computed address OTP. Secure processor 105 then increments the value of the first address timestamp by one and stores the result in first address timestamp register 320.

Secure processor 105 then, based on command information included within the address information indicating a read operation, attempts to authenticate the received double encrypted data and encrypted associated timestamp data. Secure processor 105 generates an authentication tag for the received double encrypted data and encrypted associated timestamp data. Using Galois field multipliers 312, the authentication vector stored in authentication vector register 328, and the value of the second data timestamp register 322, secure processor 105 performs the algorithm disclosed in FIG. 8 to generate the authentication tag for the received double encrypted data and encrypted associated timestamp data, as described above. Secure processor 105 then compares the generated authentication tag to the double encryption authentication tag in the read response packet. If the two values are equal, secure processor 105 authenticates the read response packet. If the two values are not equal, secure processor 105 does not authenticate the packet.

Returning to FIG. 5, once the secure processor 105 authenticates the read response packet, decryption logic 311 decrypts the five blocks containing the double encrypted data and encrypted associated timestamp data. The first block is decrypted into a first encrypted memory chunk by performing an XOR operation 565 on the first block and a first block OTP. The second block is decrypted into a second encrypted memory chunk by performing an XOR operation 565 on the second block and a second block OTP. The third block is decrypted into a third encrypted memory chunk by performing an XOR operation 565 on the third block and a third block OTP. The fourth block is decrypted into a fourth encrypted memory chunk by performing an XOR operation 565 on the fourth block and a fourth block OTP. Decryption logic 311 then decrypts the fifth block into an associated data timestamp by performing an XOR operation 565 on the fifth block and a fifth block OTP.

Decryption logic 311 generates the first block OTP by concatenating 555 the values of the second data timestamp register 322 with the first block ID, i.e. "000". Then, decryption logic 311 performs AES encryption 560 on the data double encryption key ($K_{d-de}$) stored in double encryption key register 324 and the result of the concatenation. The first block OTP is the result of the AES encryption. Decryption logic 311 generates the second block OTP, the third block OTP, and the fourth block OTP in a similar fashion by concatenating 555 the value of second data timestamp register 322 with the respective block ID and then performing AES encryption 560 on the resultant value and $K_{d-de}$. Decryption logic 311 generates the fifth block OTP by concatenating the value of second data timestamp register 322 with the fifth block ID, i.e. "100" and then performing AES encryption on the resultant value and $K_{d-de}$. The fifth block OTP is the 64 most significant bits of the result of this AES encryption. After the OTPs are generated, secure processor 105 increments the value of the second data timestamp register by one 561 and stores the resultant value in second data timestamp register 322. Decryption logic 311 generates the block OTPs prior to secure processor 105 receiving a read response packet from enhanced memory unit 115. In other words, the necessary OTPs may be pre-computed.

Last, decryption logic 311 decrypts the four encrypted memory chunks. The first memory chunk is decrypted by performing an XOR operation 580 on the first memory chunk and a first chunk OTP. The second memory chunk is decrypted by performing an XOR operation 580 on the second memory chunk and a second chunk OTP. The third memory chunk is decrypted by performing an XOR operation 580 on the third memory chunk and a third chunk OTP. The fourth memory chunk is decrypted by performing an XOR operation 580 on the fourth memory chunk and a fourth chunk OTP.

Decryption logic 311 generates the first chunk OTP by concatenating 570 the associated timestamp data, the value of fixed vector register 323, and the first chunk ID, e.g. "00". Then, decryption logic 311 performs AES encryption 575 on the data encryption key ($K_d$) stored in data key register 326 and the result of the concatenation. The first chunk OTP is the result of the AES encryption. Decryption logic 311 generates the second chunk OTP, the third chunk OTP, and the fourth chunk OTP in a similar fashion by concatenating 570 the associated data timestamp, the value of fixed vector register 323, and the respective chunk ID and then performing AES encryption 575 on the resultant value and $K_d$. Since first, second, third and fourth chunk OTPs are based on the associated timestamp data in the read response packet, decryption logic 311 generates these OTPs after the fifth block is decrypted. In other word, these block OTPs are not pre-computed.

Figure 9B:
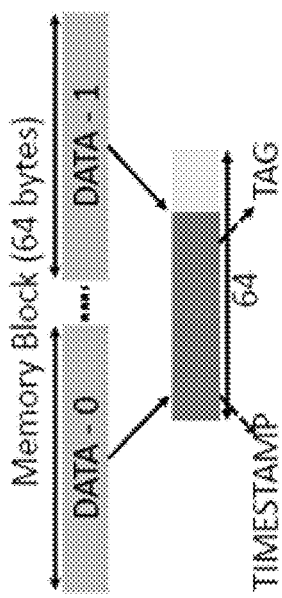
FIGS. 9A and 9B are graphical depictions of storage patterns according to the principles of the present disclosure.
Figure 9A:
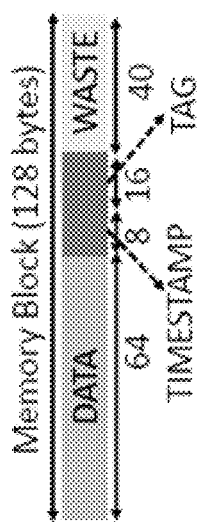

In one embodiment the data and associated meta-data are stored using a fragmented pattern. FIG. 9A depicts a fragmented storage pattern. In the fragmented pattern, a 64-byte memory block is stored along with its meta-data in memory. Since memory controller 344 can fetch both data and its meta-data using a single request, this pattern has a relatively lower complexity. However, storing meta-data with data consumes two cache blocks worth of space, even though meta-data is smaller than a cache data block.

Meta-data for a 64-byte memory block consists of a 64-bit timestamp value and a data authentication tag. Storing data and its meta-data together requires 88 bytes: 64 bytes of data, 8 bytes for the timestamp, and 16 bytes for the data authentication tag. The HMC Specification mandates that memory block sizes can be 32/64/128/256 bytes. Therefore, in the fragmented layout, a 64-byte memory block and its associated meta-data consumes 128 bytes, resulting in an effective memory utilization of 68.75%.

In a different embodiment, the data and associated meta-data are stored using a non-fragmented pattern. FIG. 9B depicts a non-fragmented storage pattern. In the non-fragmented pattern, data and meta-data are stored at non-contiguous locations. This allows meta-data of multiple memory blocks to be compactly stored together. However, this storage pattern requires two requests per data access. Any potential performance overhead due to the serialization of these requests can be reduced by exploiting vault-level parallelism. In other words, data and its associated meta-data are always stored in different vaults. Further, since adjacent data blocks may be accessed in close succession, data and meta-data of spatially adjacent data blocks in the address space are also stored in different vaults. The non-fragmented storage pattern incurs only a negligible performance overhead compared to the fragmented storage pattern, but has significantly better space utilization, 91.66%.

As noted above, in the non-fragmented pattern meta-data and data are not stored together. A 64-byte block of memory can store meta-data for two data blocks (i.e. two associated timestamps and two data authentication tags). This leads to a memory utilization of 91.66%. To exploit vault-level parallelism, the memory controller places a data block and the associated meta-data in different vaults. This allows the data and associated meta-data to be accessed in parallel. Meta-data of spatially adjacent data blocks is stored in different meta-data blocks. Enhanced memory unit 115 waits for both data and meta-data before responding to a request from secure processor 105.

The fragmented storage pattern wastes memory space in comparison to non-fragmented storage pattern. However, while the former requires a single DRAM request to retrieve both data and its associated meta-data, the latter breaks every memory request into two separate requests: one for data and one for meta-data.

Memory access times observed on the memory bus can leak sensitive information about a program's execution paths. The time taken by enhanced memory unit 115 to respond to a request from secure processor 105 can reveal sensitive information. For example, two consecutive reads from the same row of memory will have significantly lower response latency than two consecutive reads from different rows of memory.

In a conventional DRAM based system, only the processor has the ability to send requests at a chosen rate. As such, a conventional DRAM based system is unable to prevent leaks due to variations in response times from the DRAM. To solve both these leaks, in one embodiment, both secure processor 105 and enhanced memory unit 115 of trusted computing system 100 transmit packets at a constant rate. In the absence of a real packet, secure processor 105 or enhanced memory unit 115 transmits a dummy packet, which is then ignored by the receiver. As noted above, dummy packets contain randomly generated data. When there is a real packet to be sent, the sender transmits it at the next available slot. For example, at every transmission interval, secure processor 105 will transmit a dummy request packet to enhanced memory unit 115 if a read request packet or write request packet does not need to be sent. Similarly, enhanced memory unit 115 will transmit dummy response packets to secure processor 105 if it does not have a read response packet to send to secure processor 105. This design eliminates the two leaks noted above.

In one embodiment, the rate at which packets are sent can be changed for each application based on either profiling data or user input. For example, the rate can be adjusted for memory intensive applications that require a high packet rate.

In one embodiment, all request packets are 112 bytes in length. Each request packet includes an 8-byte header, an 8-byte tail, 64 bytes of encrypted data, a 16-byte address authentication tag, and a 16-byte data authentication tag. The header and tail are used to store address and command information. In a write request packet, the 64 bytes of encrypted data is the data to be written to the storage layer of enhanced memory unit 115. Since a read request is not associated with data to be written to enhanced memory unit 115, secure processor 105 includes 64 bytes of encrypted random data as the 64 bytes of data in every read request packet. Similarly, secure processor 105 includes 64 bytes of encrypted random data as the 64 bytes of data in every dummy request packet. The encrypted random data is added to read request packets and dummy request packets to make it impossible for an attacker to differentiate them from a write request packet based on the size of the packet.

In one embodiment, all response packets are 120 bytes in length. Each response packet includes an 8-byte header, an 8-byte tail, 64 bytes of data, 8 bytes of timestamp data associated with the 64 bytes of data, a 16-byte address authentication tag, and a 16-byte data authentication tag. The header and tail are used to store address and command information. In a read response packet, the 64 bytes of data is the data retrieved from a storage layer of enhanced memory unit 115. Since a write response is not associated with data retrieved from storage layers 360, enhanced memory unit 115 includes 64 bytes of encrypted random data as the 64 bytes of data and 8 bytes of encrypted random data as the 8 bytes of associated timestamp data in every write response packet. Similarly, enhanced memory unit 115 includes 64 bytes of encrypted random data as the 64 bytes of data and 8 bytes of encrypted random data as the 8 bytes of associated timestamp data in every dummy response packet. The random data is added to write response packets and dummy response packets to make it impossible for an attacker to differentiate them from a write response packet based on the size of the packet.

Figure 10A:
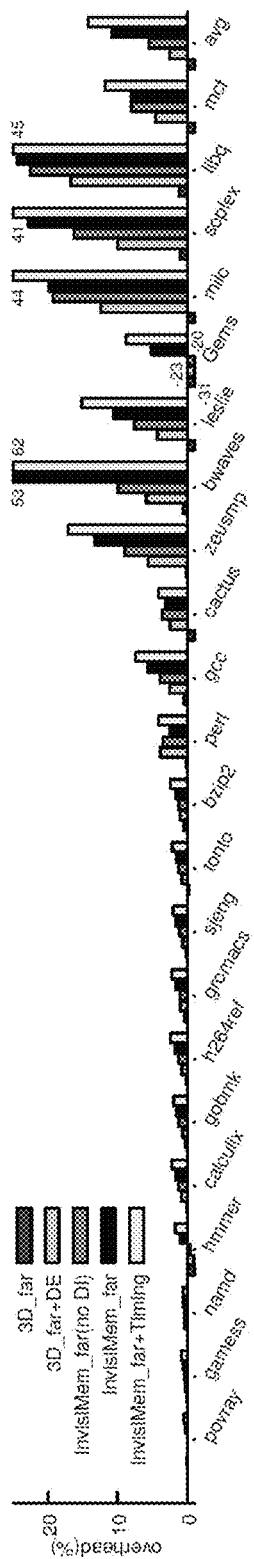
FIGS. 10A and 10B are graphs that depict the performance and energy overhead of a system according to the principles of the present disclosure compared to other systems.

FIG. 10A is a graph that shows performance overhead with respect to unsecure DRAM of various designs modeled with increasing security guarantees. The graph includes twenty two benchmarks from the SPEC CPU 2006 suite with reference inputs. Simpoint methodology with an interval size of 100 million instructions was used to represent execution samples.

Embodiments of trusted computing system 100 are molded using MARSSx86, a full system cycle accurate simulator. Secure processor 105 is similar to INTEL QUAD CORE i7-4790K Processor. To model the AES latency in trusted computing system 100, a pipelined AES core from OpenCores at 45 nm was synthesized and scaled using ITRS projections. The Galois Field multiplication used in authenticated encryption is a purely combinational circuit that operates in a single cycle. Processor power was modeled using MCPAT, a timing modeling framework for multicore and manycore architectures. AES energy is modeled to be 302 pJ per 128-bit block. For baseline DRAM, access energy was modeled to be 65 pJ/bit. A recent industry prototype reports 10.48 pJ/bit for HMC access of which 43% is attributed to SerDes circuits. The remainder is attributed to access to DRAM and logic layer. DRAM static power is modeled at 0.47 W.

DRAMSIM2 was used to model 4 GB of DRAM memory for baseline (DRAM_hp). Further, DRAMSIM2 was modified to model a 4 GB 3D-DRAM with 32 vaults and 128 TSVs per vault. The same DRAM device parameters are assumed for both traditional DRAM and 3D-DRAM. However, a DRAM clock in line with TSV signaling rate is assumed for smart memory.

In FIG. 10A, the benchmarks are plotted in increasing order of their last level cache (LLC) miss rates. The 3D_far design represents an unsecure high power processor connected to smart memory. High bandwidth smart memory helps improve performance of memory intensive programs (GemsFDTD sees gain of 31.41%). On average, smart memory delivers performance improvement of 4.02%.

In FIG. 10A, the 3D_far+DE configuration adds data encryption (DE) to the 3D_far design. This model helps determine data encryption overheads (incurred in secure processors like INTEL SGX) from address encryption overheads. Adding data encryption incurs only a modest overhead (2.58% on average) with the highest overhead being 16.69% for libquantum (libq). To determine the overhead due to providing ORAM guarantees from the overhead due to other security guarantees, InvisiMem_far (no DI) configuration which provides only ORAM guarantee is modeled. In this design both address and data are encrypted, but only addresses are authenticated. Adding these guarantees increases the overhead from 2.58% (3D_far+DE) to mere 5.55%.

The InvisiMem_far configuration depicts the design which has ORAM, data integrity and freshness guarantees, but no defense against timing channel attacks. The InvisiMem_far design, incurs an average overhead of 10.81%; with the highest overhead being 52.65% for bwaves. This is a significant improvement over prior ORAM based data integrity solutions, which also require additional hardware support for tracking and checking version numbers of memory blocks, e.g. Merkle trees. Trusted computing system 100, which does not leak the timing of memory events, is depicted as InvisiMem_far+Timing. This design increases the average overhead from 10.81% to 14.21%.

Figure 10B:
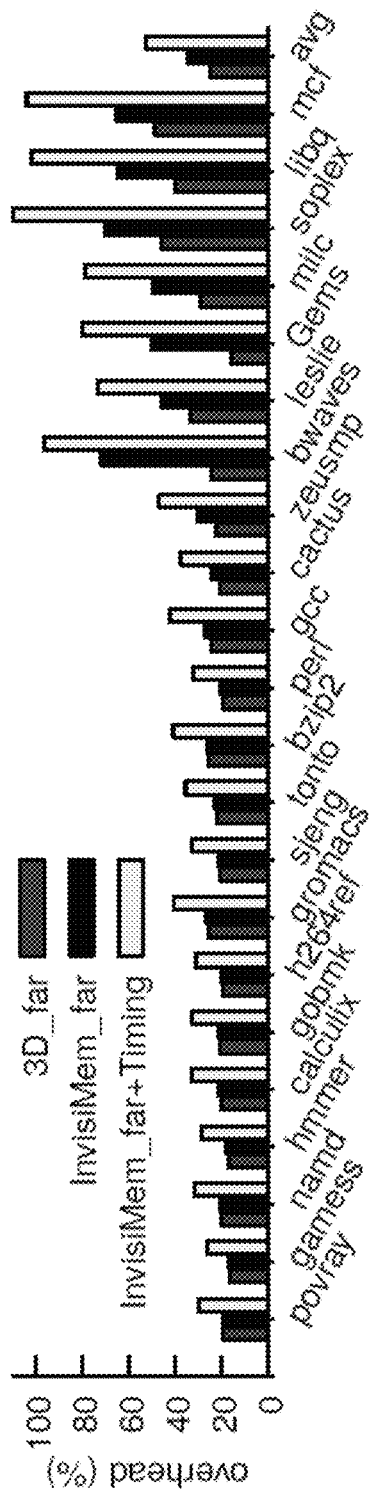

FIG. 10B shows the energy overhead of various designs. The average energy overhead of the 3D_far design is 24.98%. While the DRAM energy is lower for smart memory, the static power expended by the SerDes links is the chief cause of this overhead. The high static power is caused by the SerDes link transmitting null packets when idle. SerDes link power is a significant fraction of the total HMC power.

FIG. 10B also shows the energy overheads of InvisiMem_far configurations with and without timing channel defense. Without timing channel defense, InvisiMem_far configuration increases the energy overhead of 3D_far design from 24.98% to 34.38%; with timing channel defense the overhead is 53.03%. This is a significant improvement over prior schemes that incur one to two orders of performance loss, bandwidth, and commensurate energy overhead.

Figure 11A:
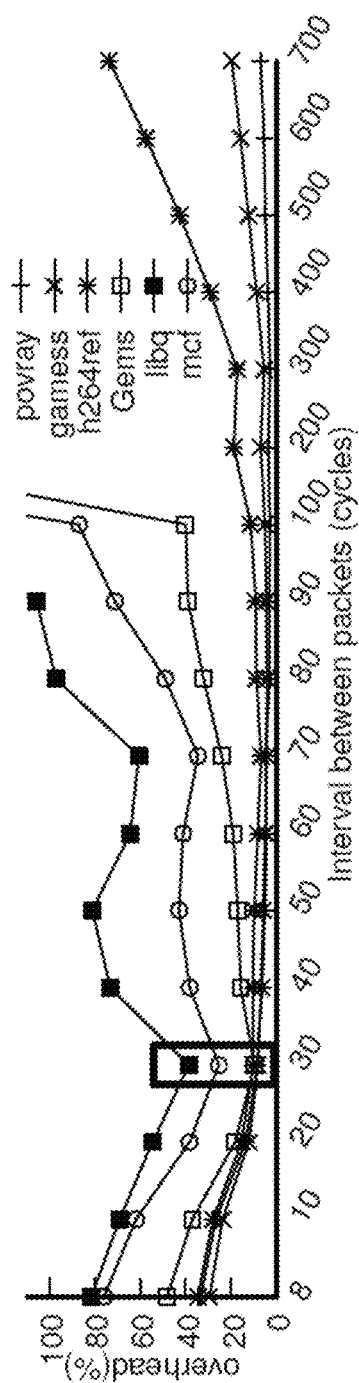
FIGS. 11A and 11B are graphs that depict the energy and performance overhead of various packet transmission rates.
Figure 11B:
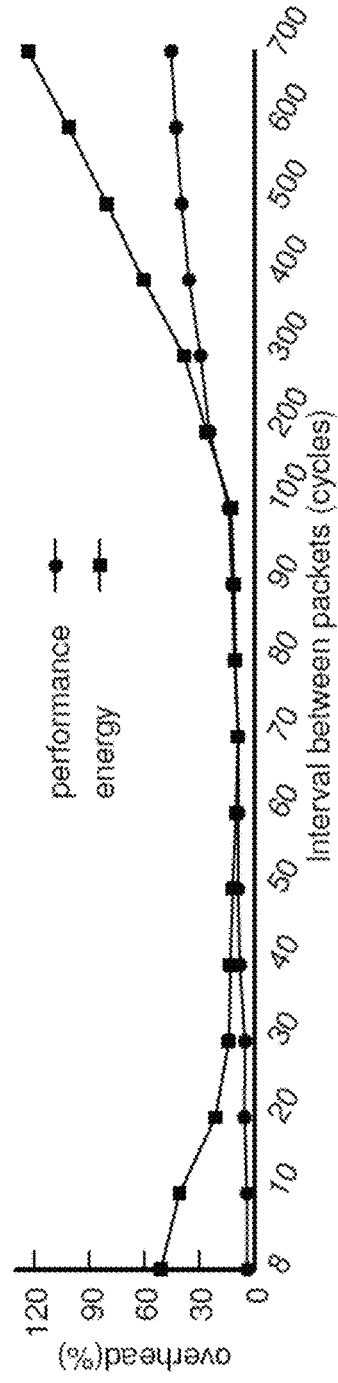

As disclosed above, trusted computing system 100 uses a static request and response rate to address timing channel leaks. FIG. 11A depicts energy delay squared ($ED^2$) overhead of various static packet rates with respect to InvisiMem_far without timing channel protection. To accurately depict a broad spectrum of behaviors, the two least intensive benchmarks, the two most memory intensive benchmarks, and the two benchmarks with highest and lowest IPC values are shown in FIG. 11A. The lowest ($ED^2$) overhead occurs at roughly at 30-cycles for all these diverse programs. This is due to the fact that the energy consumed by cryptographic units to process dummy packets stops being a significant fraction of system power as the packet interval increases beyond the range of 30-70 cycles. Since SerDes links constantly send null packets even when they are idle, there is not much to be gained by increasing the packet interval beyond this range. This combined effect is depicted in FIG. 11B (averaged across six benchmarks under study) wherein energy overheads first start to drop before showing a negative trend at higher intervals.

Figure 12A:
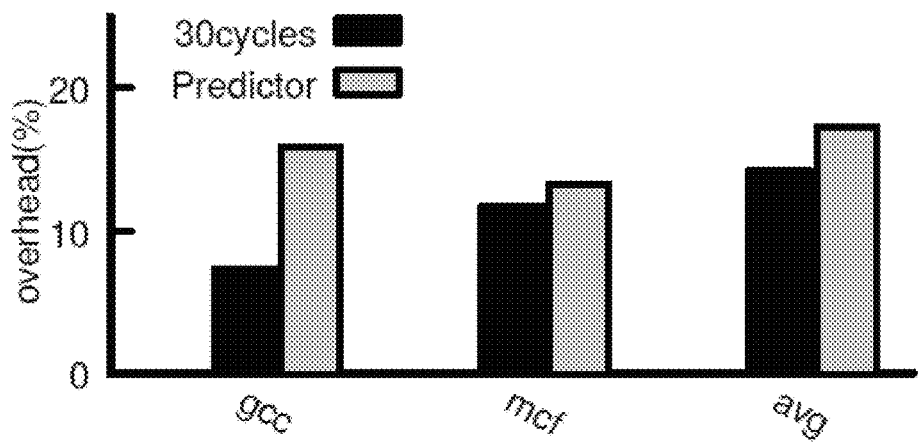
FIGS. 12A and 12B are graphs that depict the energy and performance overhead of various packet transmission rates.
Figure 12B:
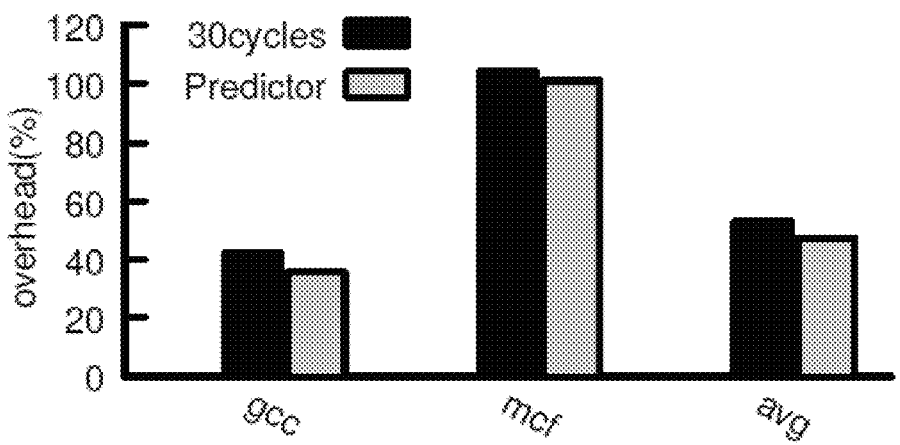

FIGS. 12A and 12B are graphs that compare a dynamic predictor to the static packet rate scheme of trusted computing system 100. The dynamic predictor has rates 30, 60, 120, and 240. FIGS. 12A and 12B include data for two packet intervals: 30 (ED2 of 159.73%). FIGS. 12A and 12B show low (gcc) and high (mcf) LLC_MPKI rate benchmarks as well as the average for all the programs. The results in FIGS. 12A and 12B show that there is not a significant potential for performance and energy improvements using a dynamic packet rate scheme. In addition, a dynamic packet rate scheme produces a weaker security guarantee than a static packet rate scheme.

Trusted computing system 100 also incurs no memory space overhead to provide ORAM guarantees. Prior systems employ the path ORAM algorithm to guarantee ORAM properties and incur 100% memory space overhead to store dummy data and require megabytes of memory to store the randomized position of each memory block. Trusted computing system 100 does not store dummy data and therefore avoids the memory space overhead of the prior systems.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "logic" or the term "controller" may be replaced with the term "circuit." The term "logic" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a secure processor configured to perform encryption and decryption; and
an enhanced memory unit in communication with the secure processor,
wherein the enhanced memory unit comprises a plurality of layers of semiconductor material,
wherein the secure processor is further configured to transmit a request packet to the enhanced memory unit,
wherein a logic layer of the plurality of layers of semiconductor material includes circuits configured to:
receive the request packet from the secure processor,
decrypt the contents of the request packet, and
transmit a response packet to the secure processor, and
wherein a storage layer of the plurality of layers of semiconductor material includes circuits configured as dynamic random access memory (DRAM).

2. The system of claim 1, wherein the secure processor and the enhanced memory unit are mounted on a circuit board.

3. The system of claim 1, wherein (i) the semiconductor material is silicon, and (ii) the logic layer and the storage layer are connected by through-silicon vias.

4. The system of claim 1, wherein the secure processor is connected to the enhanced memory unit by a serial communications bus.

5. The system of claim 1, wherein:
the request packet is a read request packet,
the read request packet includes an encrypted address, and
the encrypted address defines a location in the storage layer.

6. The system of claim 5, wherein the circuits in the logic layer are further configured to:
decrypt the encrypted address included in the read request packet into a read address,
retrieve data stored in the storage layer at the read address, and
encrypt the retrieved data,
wherein the response packet includes the encrypted retrieved data.

7. The system of claim 6, wherein (i) the data stored in the storage layer at the read address is encrypted data and (ii) encrypting the retrieved data includes encrypting the encrypted data.

8. The system of claim 1, wherein:
the request packet is a write request packet,
the write request packet includes (i) an encrypted address and (ii) encrypted data, and
the encrypted address defines a location in the storage layer.

9. The system of claim 8, wherein the circuits in the logic layer are further configured to:
decrypt, the encrypted address included in the write request packet into a write address, and
store the encrypted data included in the write request packet in the storage layer at the write address.

10. The system of claim 1, wherein:
the secure processor is further configured to transmit a plurality of request packets to the enhanced memory unit over a first period of time;
the first period of time is divided into a first set of intervals;
the circuits in the logic layer are further configured to transmit a plurality of response packets to the secure processor over a second period of time; and
the second period of time is divided into a second set of intervals.

11. The system of claim 10, wherein transmitting a plurality of request packets to the enhanced memory unit over a first period of time includes:
for each interval in the first set of intervals:
determining whether a read or write operation is pending;
in response to having determined a read operation is pending, transmitting a read request packet to the enhanced memory unit, wherein the read request packet includes:
an encrypted read address, and
first encrypted dummy data;
in response to having determined a write operation is pending, transmitting a write request packet to the enhanced memory unit, wherein the write request packet includes:
an encrypted write address, and
encrypted data to be written to memory; and
in response to having determined that neither a read operation nor a write operation are pending, transmitting a dummy request packet to the enhanced memory unit, wherein the dummy request packet includes:
a first encrypted dummy address, and
second encrypted dummy data.

12. The system of claim 11, wherein transmitting a plurality of response packets to the secure processor over a second period of time includes:
for each interval in the second set of intervals:
determining whether the read request packet or the write request packet has been received;
in response to having determined that the read request packet has been received:
decrypting the address included in the read request packet into a read address,
retrieving the data stored at the read address,
encrypting the retrieved data, and
transmitting a read response packet to the secure processor, wherein the response packet includes the encrypted retrieved data;
in response to having determined that the write request packet has been received:
decrypting the encrypted address included in the write request packet into a write address,
storing the encrypted data included in the write request packet at the write address, and
transmitting a write response packet to the secure processor; and
in response to having determined that neither a read request packet nor a write request packet has been received, sending a dummy response packet to the secure processor.

13. The system of claim 12, wherein the read request packet, the write request packet, and the dummy request packet are equal in size.

14. The system of claim 12, wherein the read response packet, the write response packet, and the dummy response packet are equal in size.

15. The system of claim 1, wherein:
the secure processor comprises:
a first address timestamp register,
a first data timestamp register, and
a second data timestamp register;
the enhanced memory unit further comprises:
a second address timestamp register,
a third data timestamp register, and
a fourth data timestamp register;
the secure processor is further configured to:
store a first value in the first address timestamp register,
store a second value in the first data timestamp register,
store a third value in the second data timestamp register, and
transmit instructions to the enhanced memory unit to (i) store the first value in the second address timestamp register, (ii) store the second value in the third data timestamp register, and (iii) store the third value in the fourth data timestamp register; and
in response to sending the request packet:
increment the first address timestamp register by one, and
increment the first data timestamp register by one; and
the circuits of the logic layer are further configured to:
receive instructions to (i) store the first value in the second address timestamp register, (ii) store the second value in the third data timestamp register, and (iii) store the third value in the fourth data timestamp register, and
in response to receiving the instructions:
store the first value in the second address timestamp register, store the second value in the third data timestamp register, and store the third value in the fourth data timestamp register.

16. The system of claim 15, wherein:
the request packet is a read request packet that includes an encrypted read address, and
the circuits in the logic layer are further configured to, in response to receiving the read request packet:
determine whether the read request packet is authentic and
in response to determining that the read request packet is authentic:
decrypt the encrypted read address,
increment the second address timestamp register by one,
increment the third data timestamp register by one,
retrieve data and associated timestamp data stored at the decrypted encrypted read address,
verify the integrity of the retrieved data,
encrypt the retrieved data and associated timestamp data,
increment the fourth data timestamp register by one, and
transmit a read response packet to the secure processor,
wherein the read response packet includes the encrypted retrieved data and the encrypted associated timestamp data.

17. The system of claim 16, wherein decrypting the encrypted read address is based on advanced encryption standard (AES) encryption and the second address timestamp register.

18. The system of claim 16, wherein the secure processor is further configured to:
receive the read response packet,
in response to receiving the read response packet, determine if the read response packet is authentic, and
in response to determining that the read response packet is authentic:
decrypt the encrypted retrieved data and the encrypted associated timestamp data contained in the read response packet, and
increment the fourth data timestamp register by one.

19. The system of claim 15, wherein:
the request packet is a write request packet that includes (i) encrypted data and (ii) an encrypted write address, and
the circuits in the logic layer are further configured to, in response to receiving the write request packet:
determine whether the write request packet is authentic, and
in response to determining that the write request packet is authentic:
decrypt the encrypted write address,
increment the second address timestamp register by one,
increment the third data timestamp register by one,
store the encrypted data at the decrypted encrypted write address, and
transmit a write response packet to the secure processor.

20. The system of claim 19, wherein decrypting the encrypted write address is based on AES encryption and the second address timestamp register.

21. The system of claim 1, wherein decrypting the contents of the request packet includes performing authenticated encryption.

22. A system comprising:
a secure processor configured to perform encryption and decryption; and
an enhanced memory unit in communication with the secure processor,
wherein:
the secure processor is further configured to transmit a request packet to the enhanced memory unit,
the enhanced memory unit includes a plurality of layers of semiconductor material,
a logic layer of the plurality of layers of semiconductor material includes circuits configured to:
receive the request packet from the secure processor,
decrypt contents of the request packet, and
transmit a response packet to the secure processor,
the request packet includes an encrypted address, and
a storage layer of the plurality of layers of semiconductor material includes circuits configured as dynamic random access memory (DRAM).

* * * * *